US010991978B2

(12) United States Patent
Sugita et al.

(10) Patent No.: US 10,991,978 B2
(45) Date of Patent: Apr. 27, 2021

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Shuhei Sugita, Kyoto (JP); Tadahiko Kubota, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 166 days.

(21) Appl. No.: 15/996,060

(22) Filed: Jun. 1, 2018

(65) Prior Publication Data

US 2018/0277897 A1 Sep. 27, 2018

Related U.S. Application Data

(63) Continuation of application No. PCT/JP2016/081546, filed on Oct. 25, 2016.

(30) Foreign Application Priority Data

Dec. 4, 2015 (JP) .............................. JP2015-237665

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 4/136* (2013.01); *H01M 4/366* (2013.01);
(Continued)

(58) Field of Classification Search
CPC .......... H01M 10/0565; H01M 10/052; H01M 10/42; H01M 4/36; H01M 4/58; H01M 4/136

See application file for complete search history.

(56) References Cited

U.S. PATENT DOCUMENTS

2003/0114614 A1* 6/2003 Wille ................ H01M 10/0565
526/247
2008/0090142 A1* 4/2008 Shibuya ................ H01M 4/621
429/163

(Continued)

FOREIGN PATENT DOCUMENTS

CN 101162791 4/2008
CN 102842734 12/2012

(Continued)

OTHER PUBLICATIONS

Machine Translation of: JP 2011/210433 A, Machida, Oct. 20, 2011.*

(Continued)

*Primary Examiner* — Kenneth J Douyette
(74) *Attorney, Agent, or Firm* — K&L Gates LLP

(57) ABSTRACT

A secondary battery includes a positive electrode, a negative electrode, and an electrolyte layer. The electrolyte layer includes an electrolytic solution, a polymer compound, and a plurality of inorganic particles. The polymer compound includes a copolymer including vinylidene fluoride and hexafluoropropylene, and a ratio W2/W1 of a weight W2 of the electrolytic solution to a weight W1 of the polymer compound is from 2.5 to 50.

12 Claims, 5 Drawing Sheets

(51) Int. Cl.
  *H01M 10/42* (2006.01)
  *H01M 4/36* (2006.01)
  *H01M 4/58* (2010.01)
  *H01M 10/056* (2010.01)
  *H01M 4/136* (2010.01)
  *H01M 4/485* (2010.01)
  *H01M 4/505* (2010.01)
  *H01M 4/525* (2010.01)
  *H01M 4/02* (2006.01)

(52) U.S. Cl.
  CPC .......... *H01M 4/485* (2013.01); *H01M 4/505* (2013.01); *H01M 4/525* (2013.01); *H01M 4/58* (2013.01); *H01M 10/052* (2013.01); *H01M 10/056* (2013.01); *H01M 10/425* (2013.01); *H01M 2004/021* (2013.01); *H01M 2004/027* (2013.01); *H01M 2004/028* (2013.01); *H01M 2220/10* (2013.01); *H01M 2220/20* (2013.01); *H01M 2220/30* (2013.01); *H01M 2300/0085* (2013.01); *H01M 2300/0091* (2013.01); *Y02E 60/10* (2013.01); *Y02T 10/70* (2013.01)

(56) References Cited

U.S. PATENT DOCUMENTS

| | | | | |
|---|---|---|---|---|
| 2012/0328915 | A1* | 12/2012 | Hirose | H01M 10/0525 |
| | | | | 429/61 |
| 2015/0200423 | A1* | 7/2015 | Mita | H01M 10/0567 |
| | | | | 429/61 |

FOREIGN PATENT DOCUMENTS

| | | | |
|---|---|---|---|
| JP | 2001-015163 | A | 1/2001 |
| JP | 2005-011595 | A | 1/2005 |
| JP | 2011-210433 | A | 10/2011 |
| JP | 2012-138335 | A | 7/2012 |

OTHER PUBLICATIONS

International Search Report and Written Opinion issued in connection with International Patent Application No. PCT/JP2016/081546, dated Jan. 24, 2017. (9 pages).

Chinese Office Action dated Jul. 27, 2020, in corresponding Chinese Application No. 210680070626.7.

* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2016/081546, filed on Oct. 25, 2016, which claims priority to Japanese patent application no. JP2015-237665 filed on Dec. 4, 2015, the entire contents of which are being incorporated herein by reference.

BACKGROUND

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

Various electronic apparatuses such as a mobile phone and a personal digital assistant (PDA) have been widely used, and it has been demanded to reduce the sizes and weights of the electronic apparatuses and to achieve their long life.

Accordingly, as an electric power source for the electronic apparatuses, a battery, in particular, a small and light-weight secondary battery capable of providing high energy density has been developed.

It has been considered to apply a secondary battery not only to the foregoing electronic apparatuses, but also to other applications.

Examples of other applications include a battery pack detachably mounted in electronic apparatuses or the like, an electric vehicle such as an electric automobile, an electric power storage system such as a home electric power server, and an electric power tool such as an electric drill.

The secondary battery includes an electrolytic solution together with a positive electrode and a negative electrode, and the electrolytic solution is generally mounted in a secondary battery in a state of being impregnated in a separator.

Other than this, the electrolytic solution may be mounted, in the secondary battery, being held by a polymer compound, in some cases. This secondary battery includes an electrolyte layer that is a so-called gel electrolyte. In the secondary battery including this electrolyte layer, leakage of the electrolytic solution is prevented.

A configuration of the electrolyte layer may largely influence battery characteristics of the secondary battery, which has led to various considerations on the configuration of the electrolyte layer.

SUMMARY

The foregoing electronic apparatuses and the like are increasingly having higher performance and multi-functionality. Accordingly, the frequency of use of electronic apparatuses and the like increases, and, at the same time, a use environment of the electronic apparatuses and the like expands.

Accordingly, it is desirable to provide a secondary battery, a battery pack, an electric vehicle, an electric power storage system, an electric power tool, and an electronic apparatus that are capable of providing excellent battery characteristics.

According to an embodiment of the present technology, a secondary battery is provided. The secondary battery includes a positive electrode, a negative electrode, and an electrolyte layer.

The electrolyte layer includes an electrolytic solution, a polymer compound, and a plurality of inorganic particles. The polymer compound includes vinylidene fluoride and hexafluoropropylene as components, and a ratio W2/W1 of a weight W2 of the electrolytic solution to a weight W1 of the polymer compound is from 2.5 to 50.

Each of a battery pack, an electric vehicle, an electric power storage system, an electric power tool, and an electronic apparatus according to an embodiment of the present technology includes a secondary battery, and the secondary battery has a configuration similar to that of the secondary battery of an embodiment of the present technology described above.

According to an embodiment of the present technology, An electrolyte layer includes an electrolytic solution, a polymer compound, and a plurality of inorganic particles. The polymer compound includes a copolymer including vinylidene fluoride and hexafluoropropylene as components, and a ratio W2/W1 of the weight W2 of the electrolytic solution to the weight W1 of the polymer compound is from 2.5 to 50. Thus, excellent battery characteristics can be obtained. In addition, the same effect can be provided by the battery pack, the electric vehicle, the electric power storage system, the electric power tool, or the electronic apparatus of an embodiment of the present technology.

It should be understood that the effects described herein are non-limiting, and other suitable properties relating to the present technology may be realized and as further described.

DETAILED DESCRIPTION

The present technology generally relates to a secondary battery including an electrolyte layer including an electrolytic solution and a polymer compound, and a battery pack, an electric vehicle, an electric power storage system, an electric power tool, and an electronic apparatus that use the secondary battery. As described herein, the present disclosure will be described based on examples with reference to the figures, but the present disclosure is not to be considered limited to the examples, and various numerical values and materials in the examples are considered by way of example.

First, a secondary battery according to an embodiment of the present technology is described.

Figure 1:
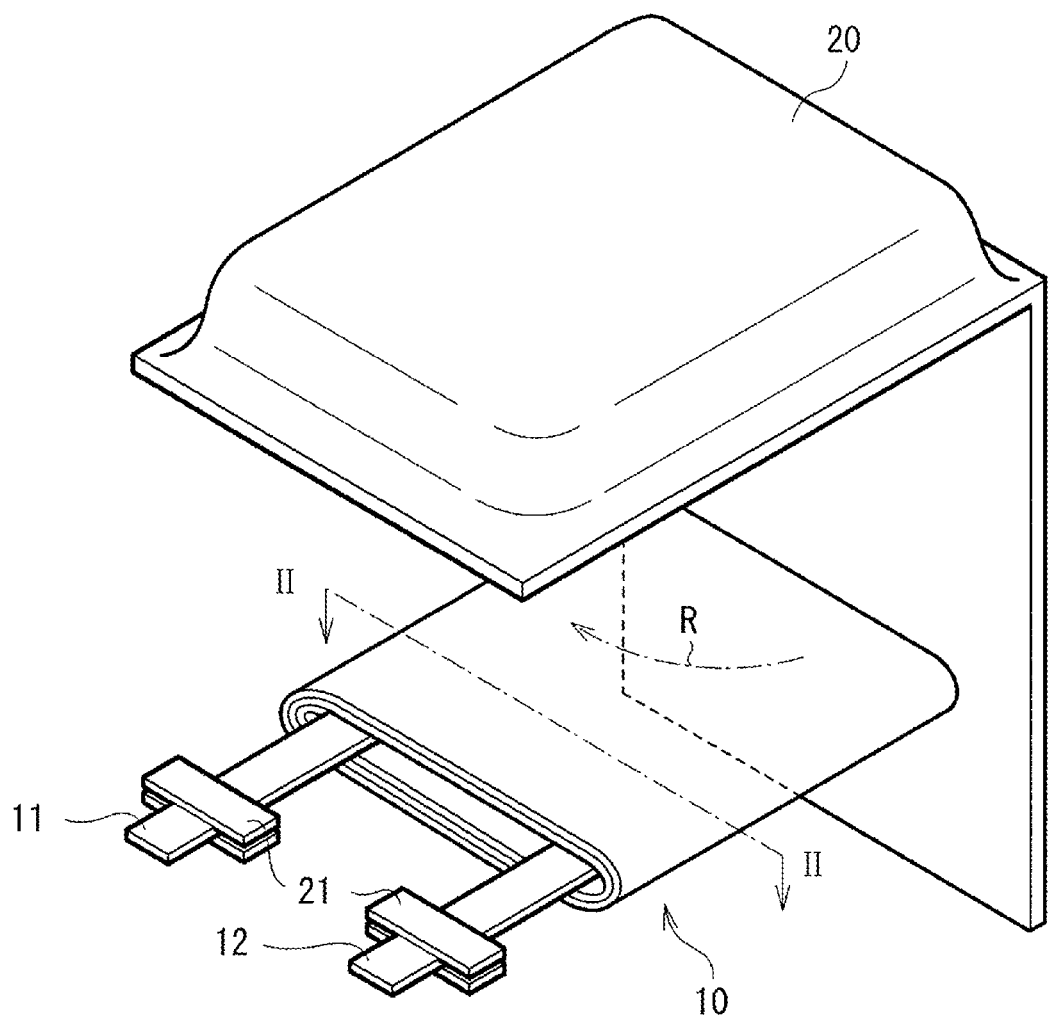
FIG. 1 is a perspective view illustrating a configuration of a secondary battery (laminated-film-type) according to an embodiment of the present technology.
Figure 2:
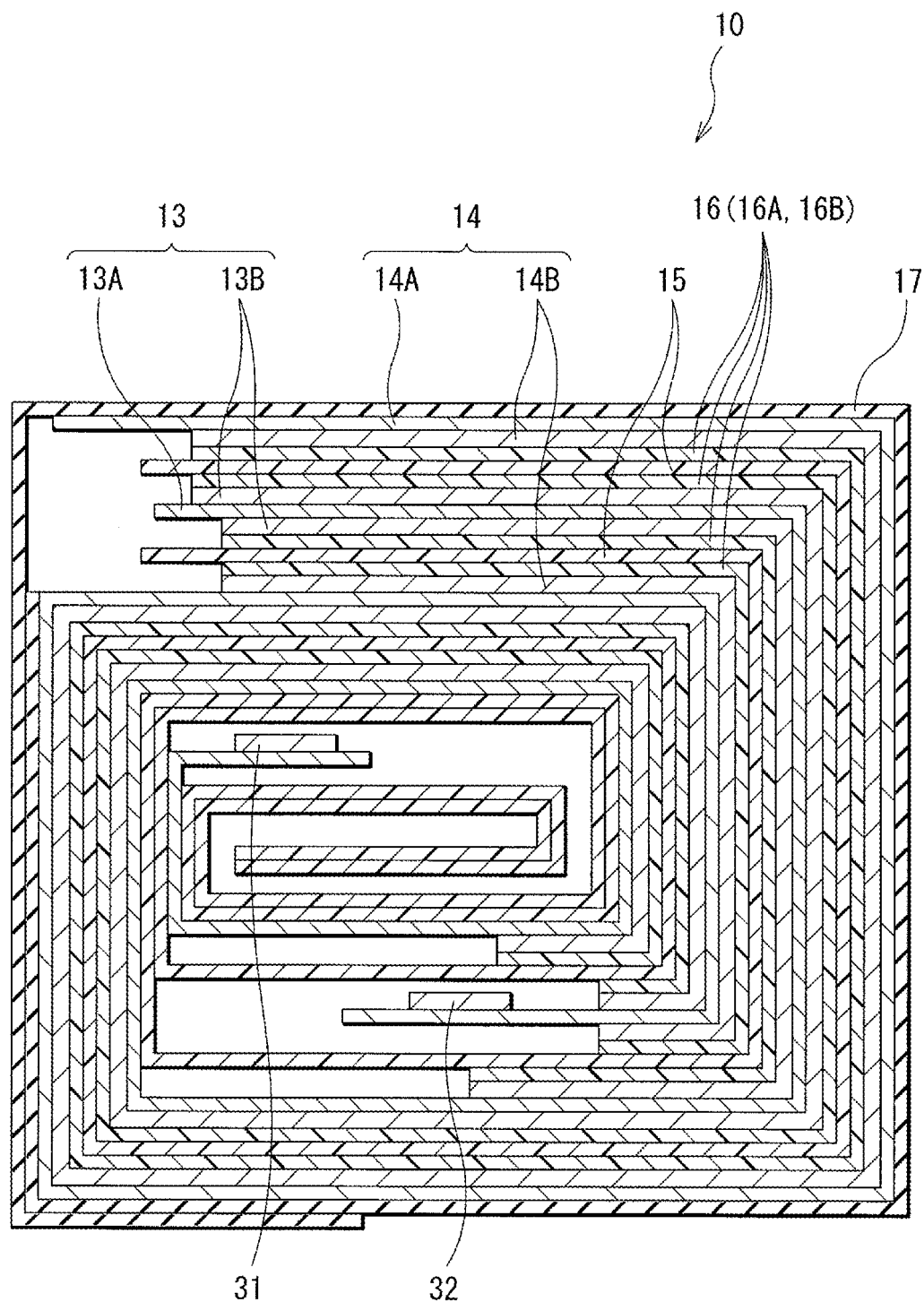
FIG. 2 is a cross-sectional view of a spirally wound electrode body taken along a line II-II illustrated in FIG. 1.

FIG. 1 shows a perspective configuration of a secondary battery. FIG. 2 illustrates a cross-sectional configuration of a spirally wound electrode body 10 taken along a line II-II illustrated in FIG. 1.

The secondary battery described herein obtains capacity of a negative electrode 14 by insertion and extraction of an electrode reactant, and has a so-called laminated-film-type battery structure.

"Electrode reactant" is a substance related to an electrode reaction. To give an example, in a lithium ion secondary battery in which battery capacity is obtained by insertion and extraction of lithium (Li), the electrode reactant is lithium (or lithium ion). Description is provided below referring to, as an example, a case where the secondary battery of the present technology is a lithium ion secondary battery.

In the secondary battery, for example, as illustrated in FIG. 1, the spirally wound electrode body 10 as a battery element is contained inside a film-like outer package member 20. In the spirally wound electrode body 10, for example, a positive electrode 13 and a negative electrode 14 stacked with a separator 15 and an electrolyte layer 16 interposed therebetween are spirally wound. A positive electrode lead 11 is attached to the positive electrode 13, and a negative electrode lead 12 is attached to the negative electrode 14. An outermost periphery of the spirally wound electrode body 10 is protected by a protective tape 17.

The positive electrode lead 11 is led out from inside to outside of the outer package member 20, for example. The positive electrode lead 11 contains, for example, one or more of conductive materials such as aluminum (Al), and these conductive materials may be in the shape of, for example, a thin plate or mesh.

The negative electrode lead 12 is led out from inside to outside of the outer package member 20 in the same direction as the positive electrode lead 11, for example. The negative electrode lead 12 contains, for example, one or more of conductive materials such as copper (Cu), nickel (Ni), and stainless steel, and these conductive materials may be in the shape of, for example, a thin plate or mesh.

The outer package member 20 is, for example, one film that is foldable in a direction of an arrow R illustrated in FIG. 1, and the outer package member 20 has a depression for containing the spirally wound electrode body 10 in part thereof. The outer package member 20 is a laminated film in which a fusion-bonding layer, a metal layer, and a surface protective layer are stacked in this order, for example. In a process of manufacturing the secondary battery, the outer package member 20 is folded such that portions of the fusion-bonding layer face each other with the spirally wound electrode body 10 interposed therebetween, and outer edges of the portions of the fusion-bonding layer are fusion-bonded. Alternatively, two laminated films bonded to each other by, for example, an adhesive may form the outer package member 20. The fusion-bonding layer includes, for example, one or more of films of polyethylene, polypropylene, and other materials. The metal layer includes, for example, one or more of an aluminum foil and the like. The surface protective layer includes, for example, one or more of films of nylon, polyethylene terephthalate, and other materials.

In particular, the outer package member 20 is preferably an aluminum laminated film in which a polyethylene film, an aluminum foil, and a nylon film are stacked in this order. However, the outer package member 20 may be a laminated film having any other laminated structure, a polymer film such as polypropylene, or a metal film.

For example, a close-contact film 21 to prevent outside air intrusion is inserted between the outer package member 20 and the positive electrode lead 11, and the close-contact film 21 contains one or more of materials having close-contact characteristics with respect to the positive electrode lead 11. Examples of the material having close-contact characteristics include polyolefin resin, and more specific examples thereof include polyethylene, polypropylene, modified polyethylene, and modified polypropylene.

For example, the foregoing close-contact film 21 is inserted between the outer package member 20 and the negative electrode lead 12. Details concerning the close-contact film 21 are, for example, similar to details concerning the close-contact film 21 inserted between the outer package member 20 and the positive electrode lead 11, except that the close-contact film 21 contains a material having close-contact characteristics with respect to the negative electrode lead 12.

As shown in FIG. 2, the positive electrode 13 includes, for example, a positive electrode current collector 13A and a positive electrode active material layer 13B provided on the positive electrode current collector 13A.

The positive electrode active material layer 13B may be provided on only one surface or both surfaces of the positive electrode current collector 13A. FIG. 2 illustrates, for example, the case where the positive electrode active material layers 13B are provided on both surfaces of the positive electrode current collector 13A.

The positive electrode current collector 13A includes, for example, one or more of conductive materials. The kind of the conductive material is not particularly limited; however, examples of the conductive material include metal materials such as aluminum, nickel, and stainless steel, and an alloy containing two or more kinds of the metal materials may be used. The positive electrode current collector 13A may be configured of a single layer, or may be configured of multiple layers.

The positive electrode active material layer 13B includes one or more of positive electrode materials capable of inserting and extracting lithium as a positive electrode active material. However, the positive electrode active material layer 13B may further contain one or more of other materials such as a positive electrode binder and a positive electrode conductive agent.

The positive electrode material is preferably one or more of lithium-containing compounds. The kind of the lithium-containing compound is not specifically limited, but in particular is preferably a lithium-containing composite oxide and a lithium-containing phosphate compound. This is because a high energy density can be obtained.

The "lithium-containing composite oxide" is an oxide containing lithium and one or more of elements other than lithium (the elements are hereinafter referred to as "other elements") as constituent elements. The lithium-containing oxide has, for example, one or more crystal structures such as a layered rock-salt type crystal structure and a spinel type crystal structure.

The "lithium-containing phosphate compound" is a phosphate compound containing lithium and one or more of other elements as constituent elements. The lithium-containing phosphate compound has, for example, one or more crystal structures such as an olivine type crystal structure.

The kind of the other element is not particularly limited as long as the other element is one or more of arbitrary elements (except for lithium). In particular, the other elements are preferably one or more of elements that belong to Groups 2 to 15 in the long-periodic table. More specifically, the other elements are more preferably one or more of metal elements of nickel, cobalt, manganese, iron, and the like. This is because a high voltage can be obtained.

Examples of the lithium-containing composite oxide having the layered rock-salt type crystal structure include one or more of compounds represented by the following respective formulas (1) to (3).

$$Li_aMn_{(1-b-c)}Ni_bM1_cO_{(2-d)}F_e \quad (1)$$

(M1 is at least one element of cobalt, magnesium, aluminum, boron, titanium, vanadium, chromium, iron, copper, zinc, zirconium, molybdenum, tin, calcium, strontium, and tungsten. "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. It is to be noted that the composition of lithium varies depending on charge and discharge states, and "a" is a value in a completely-discharged state.)

$$Li_aNi_{(1-b)}M2_bO_{(2-c)}F_d \quad (2)$$

(M2 is at least one element of cobalt, manganese, magnesium, aluminum, boron, titanium, vanadium, chromium, iron, copper, zinc, molybdenum, tin, calcium, strontium, and tungsten. "a" to "d" satisfy $0.8 \leq a \leq 1.2$, $0.005 < b < 0.5$, $-0.1 \leq c \leq 0.2$, and $0 \leq d \leq 0.1$. It is to be noted that the composition of lithium varies depending on charge and discharge states, and "a" is a value in a completely-discharged state.)

$$Li_aCO_{(1-b)}M3_bO_{(2-c)}F_d \quad (3)$$

(M3 is at least one element of nickel, manganese, magnesium, aluminum, boron, titanium, vanadium, chromium, iron, copper, zinc, molybdenum, tin, calcium, strontium, and tungsten. "a" to "d" satisfy $0.8 \leq a \leq 1.2$, $0b < 0.5$, $-0.1 \leq c \leq 0.2$, and $0 \leq d \leq 0.1$. It is to be noted that the composition of lithium varies depending on charge and discharge states, and "a" is a value in a completely-discharged state.)

Examples of the lithium-containing composite oxide having the layered rock-salt type crystal structure include LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.8}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

In the case where the lithium-containing composite oxide having the layered rock-salt type crystal structure contains, as constituent elements, nickel, cobalt, manganese, and aluminum, an atomic ratio of nickel is preferably not less than 50 at %. This is because a high energy density can be obtained.

Examples of the lithium-containing composite oxide having the spinel type crystal structure include compounds represented by the following formula (4).

$$Li_aMn_{(2-b)}M4_bO_cF_d \quad (4)$$

(M4 is at least one element of cobalt, nickel, magnesium, aluminum, boron, titanium, vanadium, chromium, iron, copper, zinc, molybdenum, tin, calcium, strontium, and tungsten. "a" to "d" satisfy $0.9 \leq a \leq 1.1$, $0 \leq b \leq 0.6$, $3.7 \leq c \leq 4.1$, and $0 \leq d \leq 0.1$. It is to be noted that the composition of lithium varies depending on charge and discharge states, and "a" is a value in a completely-discharged state.)

Examples of the lithium-containing composite oxide having the spinel type crystal structure include LiMn$_2$O$_4$.

Examples of the lithium-containing phosphate compound having the olivine type crystal structure include compounds represented by the following formula (5).

$$Li_aM5PO_4 \quad (5)$$

(M5 is at least one element of cobalt, manganese, iron, nickel, magnesium, aluminum, boron, titanium, vanadium, niobium, copper, zinc, molybdenum, calcium, strontium, tungsten, and zirconium. "a" satisfies $0.9 \leq a \leq 1.1$. It is to be noted that the composition of lithium varies depending on charge and discharge states, and "a" is a value in a completely-discharged state.)

Examples of the lithium-containing phosphate compound having the olivine type crystal structure include LiFePO$_4$, LiMnPO$_4$, LiFe$_{0.5}$Mn$_{0.5}$PO$_4$, and LiFe$_{0.3}$Mn$_{0.7}$PO$_4$.

The lithium-containing composite oxide may include, for example, a compound represented by the following formula (6).

$$(Li_2MnO_3)_x(LiMnO_2)_{1-x} \quad (6)$$

(x satisfies $0 \leq x \leq 1$.)

In addition, the positive electrode material may include, for example, an oxide, a disulfide, a chalcogenide, or a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

However, the positive electrode material is not limited to the foregoing materials, and other materials may be used.

The positive electrode binder contains, for example, one or more of synthetic rubber, polymer compounds, and the like. Examples of the synthetic rubber include styrene-butadiene-based rubber, fluororubber, and ethylene propylene diene. Examples of the polymer compounds include polyvinylidene fluoride, polyacrylic acid, and polyimide.

The positive electrode conductive agent contains, for example, one or more of carbon materials and the like. Examples of the carbon materials include graphite, carbon black, acetylene black, and Ketjen black. It is to be noted that the positive electrode conductive agent may be a metal material, a conductive polymer, or the like as long as the positive electrode conductive agent has electric conductivity.

As shown in FIG. 2, the negative electrode 14 includes, for example, a negative electrode current collector 14A and a negative electrode active material layer 14B provided on the negative electrode current collector 14A.

The negative electrode active material layer 14B may be provided on only one surface or both surfaces of the negative electrode current collector 14A. FIG. 2 illustrates, for example, the case where the negative electrode active material layers 14B are provided on both surfaces of the negative electrode current collector 14A.

The negative electrode current collector 14A contains, for example, one or more of conductive materials. The kind of the conductive material is not particularly limited; however, examples of the conductive material include metal materials such as copper, aluminum, nickel, and stainless steel, and an alloy containing two or more kinds of the metal materials may be used. The negative electrode current collector 14A may be configured of a single layer, or may be configured of multiple layers.

A surface of the negative electrode current collector 14A may be preferably roughened. This makes it possible to improve close-contact characteristics of the negative electrode active material layer 14B with respect to the negative electrode current collector 14A by a so-called anchor effect. In this case, it is enough that the surface of the negative electrode current collector 14A at least in a region facing the negative electrode active material layer 14A is roughened. Examples of the roughening method include a method of forming fine particles by utilizing electrolytic treatment. Through the electrolytic treatment, fine particles are formed on the surface of the negative electrode current collector 14A in an electrolytic bath by an electrolytic method to make the surface of the negative electrode current collector 14A rough. A copper foil fabricated by an electrolytic method is generally called "electrolytic copper foil."

The negative electrode active material layer 14B includes one or more of negative electrode materials capable of inserting and extracting lithium as a negative electrode active material. However, the negative electrode active material layer 14B may further contain one or more of materials such as a negative electrode binder and a negative electrode conductive agent. Details of the negative electrode binder and the negative electrode conductive agent are, for example, similar to those of the positive electrode binder and the positive electrode conductive agent.

However, the chargeable capacity of the negative electrode material is preferably larger than the discharge capacity of the positive electrode 13 for the purpose of preventing lithium metal from being unintentionally precipitated on the negative electrode 14 in the middle of charging. That is, the electrochemical equivalent of the negative electrode material capable of inserting and extracting lithium is preferably larger than the electrochemical equivalent of the positive electrode 13.

The negative electrode material is, for example, one or more of carbon materials. The carbon material causes an extremely small change in a crystal structure thereof when lithium is inserted or extracted, which stably achieves high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that a spacing of (002) plane in the non-graphitizable carbon is preferably not less than 0.37 nm, and a spacing of (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is obtained by firing (carbonizing) a polymer compound such as phenol resin and furan resin at appropriate temperature. Other than the materials mentioned above, the carbon material may be low crystalline carbon subjected to a heat treatment at temperature of about 1000° C. or lower, or may be amorphous carbon. The shape of the carbon material may be any of a fibrous shape, a spherical shape, a granular shape, and a scale-like shape.

Further, the negative electrode material is, for example, a material (metal-based material) containing one or more of metal elements and metalloid elements as constituent elements. This is because a high energy density can be obtained.

The metal-based material may be a simple substance, an alloy, a compound, or two or more of them. In addition, the metal-based material may be a material including, at least in part, one or more phases of the foregoing simple substance, alloy, and compound. The "simple substance" described herein merely refers to a simple substance in a general sense (in which a small amount of impurity may be contained), and does not necessarily refer to a simple substance having a purity of 100%. The alloy includes not only a material containing two or more of metal elements as constituent elements but also a material containing one or more of metal elements and one or more of metalloid elements as constituent elements. This alloy may contain a non-metallic element as a constituent element. Examples of the structure of the metal-based material include a solid solution, a eutectic crystal (a eutectic mixture), an intermetallic compound, and a structure in which two or more thereof coexist.

The metal elements and the metalloid elements described above are, for example, one or more of metal elements and metalloid elements that are able to form an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon or tin or both is preferable. The reason for this is that silicon and tin have a superior ability of inserting and extracting lithium, and therefore provide significantly high energy density.

A material that contains silicon, tin, or both as constituent elements may be any of a simple substance, an alloy, and a compound of silicon, may be any of a simple substance, an alloy, and a compound of tin, may be two or more thereof, or may be a material that includes one or more phases thereof at least in part.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen as constituent elements other than silicon. The compound of silicon contains, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. v in $SiO_v$ may be $0.2<v<1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen as constituent elements other than tin. The compound of tin contains, for example, one or more of the elements described related to the alloy of tin, as constituent elements other than tin.

Specific examples of the alloy of tin and the compound of tin include $SnO_w$ ($0<w\leq2$), $SnSiO_3$, $LiSnO$, and $Mg_2Sn$.

In particular, the material containing tin as a constituent element is preferably, for example, a material (Sn-containing material) that includes, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, one or more of elements such as boron, carbon, aluminum, and phosphorus (P). This is because the Sn-containing material containing the second constituent element and the third constituent element makes it possible to achieve, for example, high battery capacity and superior cycle characteristics.

In particular, the Sn-containing material is preferably a material (a SnCoC-containing material) that includes tin, cobalt, and carbon as constituent elements. In the SnCoC-containing material, for example, a content of carbon is from 9.9% to 29.7%, and a ratio of contents of tin and cobalt (Co/(Sn+Co)) is from 20% to 70%. This is because a high energy density can be obtained.

The SnCoC-containing material preferably has a phase that includes tin, cobalt, and carbon, and the phase is preferably low crystalline or amorphous. The phase is a phase (reaction phase) capable of reacting with lithium, and therefore existence of the reaction phase results in achievement of superior characteristics in the SnCoC-containing material. Naturally, the reaction phase may include a low crystalline portion and an amorphous portion. A half width (a diffraction angle $2\theta$) of a diffraction peak obtained by X-ray diffraction of this reaction phase may be preferably 1° or larger in the case where a CuK$\alpha$ ray is used as a specific X-ray, and an insertion rate is 1°/min. This makes it possible to insert and extract lithium more smoothly in the SnCoC-containing material, and to decrease reactivity of the SnCoC-containing material with the electrolytic solution. In some cases, the SnCoC-containing material may include a phase that contains simple substances of the respective constituent elements or part thereof in addition to the low-crystalline phase or the amorphous phase.

For example, comparison between X-ray diffraction charts before and after an electrochemical reaction with lithium makes it possible to easily determine whether the diffraction peak obtained by the X-ray diffraction corresponds to the reaction phase that is able to react with lithium. Specifically, for example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta=20°$ to 50°. Such a reaction phase includes, for example, the respective constituent elements described above, and it is considered that such a reaction phase has become low crystalline or amorphous mainly because of existence of carbon.

In the SnCoC-containing material, part or all of carbon that is the constituent element thereof is preferably bound to a metal element or a metalloid element that is another constituent element thereof. This is because cohesion or crystallization of, for example, tin is suppressed. It is possible to confirm a binding state of the elements, for example, by an X-ray photoelectron spectroscopy method (XPS). In a commercially available device, for example, an Al-K$\alpha$ ray or a Mg-K$\alpha$ ray is used as a soft X-ray. In the case where part or all of carbon are bound to a metal element, a metalloid element, or the like, the peak of a synthetic wave of 1s orbit of carbon (C1s) appears in a region lower than 284.5 eV. It is assumed that energy calibration is made so that the peak of 4f orbit of a gold atom (Au4f) is obtained at 84.0 eV. At this time, in general, since surface contamination carbon exists on the material surface, the peak of C1s of the surface contamination carbon is regarded as 284.8 eV, and this peak is used as energy standard. In XPS measurement, the waveform of the peak of C1s is obtained as a form including the peak of the surface contamination carbon and the peak of carbon in the SnCoC-containing material. The two peaks may be therefore separated from each other, for example, by analysis with use of commercially available software. In the analysis of the waveform, the position of the main peak existing on the lowest bound energy side is set to the energy reference (284.8 eV).

The SnCoC-containing material is not limited to the material (SnCoC) that contains only tin, cobalt, and carbon as constituent elements The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements is also preferable. Any composition of the SnCoFeC-containing material may be adopted. To give an example, in the case where a content of iron is set smaller, a content of carbon is from 9.9% to 29.7%, a content of iron is from 0.3% to 5.9%, and a ratio of contents of tin and cobalt (Co/(Sn+Co)) is from 30% to 70%. Alternatively, in the case where the content of iron is set larger, the content of carbon is from 11.9% to 29.7%, the ratio of contents of tin, cobalt, and iron ((Co+Fe)/(Sn+Co+Fe)) is from 26.4% to 48.5%, and the ratio of contents of cobalt and iron (Co/(Co+Fe)) is from 9.9% to 79.5%. Such composition ranges allow for achievement of high energy density. Physical characteristics (such as a half width) of the SnCoFeC-containing material are similar to physical characteristics of the foregoing SnCoC-containing material.

Other than the materials mentioned above, the negative electrode material may be, for example, one or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

The metal-based material, in particular, the material containing one or both of silicon and tin as constituent elements has a concern that such a material is easily and radically expanded or contracted at the time of charge and discharge, whereas such a material has an advantage of high theoretical capacity. In contrast, the carbon material has an advantage that the carbon material is less prone to be expanded or contracted at the time of charge and discharge, whereas the carbon material has a concern of low theoretical capacity. Accordingly, using both the carbon material and the metal-based material makes it possible to suppress expansion and contraction during charging and discharging while achieving high theoretical capacity (in other words, high battery capacity).

The negative electrode active material layer 14B is formed by, for example, one or more of a coating method, a gas phase method, a liquid phase method, a spraying method, and a firing method (sintering method). The coating method is a method in which, for example, after a particulate (powder) negative electrode active material is mixed with a negative electrode binder and the like, the mixture is dispersed in an organic solvent, and the negative electrode current collector 14A is coated with the resultant. Examples of the gas phase method include a physical deposition method and a chemical deposition method. More specifically, examples thereof include vacuum evaporation method, sputtering method, ion plating method, laser ablation method, thermal chemical vapor deposition method, chemical vapor deposition (CVD) method, and plasma chemical vapor deposition method. Examples of the liquid phase method include electrolytic plating method and electroless plating method. The spraying method is a method in which a negative electrode active material in a fused state or a semi-fused state is sprayed onto the surface of the negative electrode current collector 14A. The firing method is, for example, a method in which after the negative electrode current collector 14A is coated with the mixture dispersed in, for example, the organic solvent by the coating method, the mixture is subjected to heat treatment at a temperature higher than the melting point of the negative electrode binder or the like. Examples of the firing method include atmosphere firing method, reactive firing method, and hot press firing method.

In the secondary battery, as described above, the electrochemical equivalent of the negative electrode material capable of inserting and extracting lithium is larger than the electrochemical equivalent of the positive electrode for the purpose of preventing lithium from being unintentionally precipitated on the negative electrode 14 in the middle of charge. Further, in the case where an open circuit voltage (that is, a battery voltage) in a completely-charged state is not less than 4.25 V, an extraction amount of lithium per unit mass is larger than that in the case where the open circuit voltage is 4.20 V, even if the same positive electrode active material is used, and therefore amounts of the positive electrode active material and the negative electrode active material are adjusted in accordance therewith. Accordingly, high energy density is obtained.

Since the separator 15 is disposed between the positive electrode 13 and the negative electrode 14, the positive electrode 13 and the negative electrode 14 are isolated with the separator 15 interposed therebetween. The separator 15 allows lithium ions to pass therethrough while preventing short circuit resulting from contact of the positive electrode 13 and the negative electrode 14.

The separator 15 includes, for example, one or more of porous films made of synthetic resin, ceramics, or the like. The separator 15 may be a laminated film including two or more porous films. The synthetic resin includes, for example, one or more of elements such as polytetrafluoroethylene, polypropylene, and polyethylene.

The separator 15 may include, for example, the foregoing porous film (base material layer) and a polymer compound layer provided on the base material layer. The reason for this is that, this allows for an improvement in close-contact characteristics of the separator 15 with respect to each of the positive electrode 13 and the negative electrode 14, thereby suppressing deformation of the spirally wound electrode body 10. This makes it possible to suppress decomposition reaction of the electrolytic solution and to suppress liquid leakage of the electrolytic solution with which the base material layer is impregnated. Accordingly, electric resistance is less prone to increase even if charge and discharge are repeated, and swollenness of the secondary battery is suppressed.

The polymer compound layer may be provided on a single surface or both surfaces of the base material layer. The polymer compound layer includes, for example, one or more of polymer compounds such as polyvinylidene fluoride. This is because polyvinylidene fluoride has superior physical strength and is electrochemically stable. When the polymer compound layer is formed, for example, the base material layer is coated with a solution prepared by dissolving the polymer compound in, for example, an organic solvent, and thereafter, the base material layer is dried. Alternatively, the base material layer may be immersed in the solution, and thereafter the base material layer may be dried.

The electrolyte layer 16 includes an electrolytic solution, a polymer compound, and a plurality of inorganic particles. In the electrolyte layer 16, the electrolytic solution is held by the polymer compound, and the plurality of inorganic particles are dispersed in the polymer compound. That is, the electrolyte layer 16 described here is a so-called gel electrolyte. The electrolyte layer 16 is used because high ion conductivity (for example, 1 mS/cm or higher at room temperature) is achieved, and, at the same time, liquid leakage of the electrolytic solution is prevented. However, the electrolyte layer 16 may further contain one or more of other materials such as various additives.

Here, for example, the electrolyte layer 16 (positive electrode side electrolyte layer 16A) is provided on the positive electrode 13 (positive electrode active material layer 13B), and the electrolyte layer 16 (negative electrode side electrolyte layer 16B) is provided on the negative electrode 14 (negative electrode active material layer 14B). That is, for example, the positive electrode side electrolyte layer 16A is disposed between the positive electrode 13 and the separator 15, and the negative electrode side electrolyte layer 16B is disposed between the negative electrode 14 and the separator 15.

However, while the positive electrode side electrolyte layer 16A is provided on the positive electrode 13, the negative electrode side electrolyte layer 16B may not be provided on the negative electrode 14. Alternatively, while the negative electrode side electrolyte layer 16B is provided on the negative electrode 14, the positive electrode side electrolyte layer 16A may not be provided on the positive electrode 13. FIG. 2 shows a case where, for example, the positive electrode side electrolyte layer 16A is provided on the positive electrode 13, and the negative electrode side electrolyte layer 16B is provided on the negative electrode 14.

Hereinafter, as necessary, two names, that is, "positive electrode side electrolyte layer 16A" and "negative electrode side electrolyte layer 16B" are used, and the positive electrode side electrolyte layer 16A and the negative electrode side electrolyte layer 16B are collectively referred to as the "electrolyte layer 16".

The polymer compound includes one or more of specific copolymers, and the copolymer contains vinylidene fluoride and hexafluoropropylene as components (polymerization units).

"The copolymer contains vinylidene fluoride and hexafluoropropylene as components" means that two or more of raw materials (so-called monomers) containing vinylidene fluoride and hexafluoropropylene are used, and the copolymer is formed by polymerization reaction of the two or more of raw materials.

In detail, each of vinylidene fluoride and hexafluoropropylene is a raw material (monomer) for forming a copolymer. That is, each of vinylidene fluoride and hexafluoropropylene includes an unsaturated bond (carbon-carbon double bond). Thus, in a process of forming the copolymer, vinylidene fluoride and hexafluoropropylene are subjected to polymerization reaction (are polymerized) by utilizing the unsaturated bond (carbon-carbon double bond) included in each of vinylidene fluoride and hexafluoropropylene.

Hereinafter, in order to distinguish from a copolymer which does not contain vinylidene fluoride and hexafluoropropylene as components, the copolymer containing vinylidene fluoride and hexafluoropropylene as components is referred to as a "specific copolymer". Naturally, the specific copolymer may be a copolymer containing vinylidene fluoride and hexafluoropropylene as components.

The specific copolymer described here is a so-called random copolymer. Along with this, the sequence (coupling) order of components (monomers) such as vinylidene fluoride and hexafluoropropylene in the specific copolymer is not particularly limited.

The reason why the polymer compound includes the specific copolymer is that high ion conductivity is obtained in the electrolyte layer 16 and the physical strength (shape stability) of the electrolyte layer 16 is secured. Accordingly, even if the secondary battery is charged and discharged under severe conditions such as a low temperature environment, the discharge capacity is unlikely to decrease.

The configuration of the specific copolymer is not particularly limited as long as the specific copolymer contains vinylidene fluoride and hexafluoropropylene as components as described above. Details regarding the configuration of the specific copolymer are as follows, for example.

Vinylidene fluoride is a component mainly playing a role of improving the physical strength and electrochemical stability of the electrolyte layer 16. Although the copolymerization amount of vinylidene fluoride in the specific copolymer is not particularly limited, it is preferably 92.5 wt % to 98.5 wt %. This is because the copolymerization amount of vinylidene fluoride is optimized, so that sufficient physical strength can be obtained in the electrolyte layer 16.

Hexafluoropropylene is a component mainly playing a role of improving the ionic conductivity of the electrolyte layer 16. Although the copolymerization amount of hexafluoropropylene in the specific copolymer is not particularly limited, it is preferably 1.5 wt % to 7.5 wt %. This is because the copolymerization amount of hexafluoropropylene is optimized, so that sufficient ion conductivity can be obtained in the electrolyte layer 16.

Here, a ratio W2/W1 of a weight W2 of the electrolytic solution to a weight W1 of the polymer compound containing the specific copolymer is 2.5 to 50, preferably 4 to 40. This is because when the electrolyte layer 16 includes a plurality of inorganic particles together with the electrolytic solution and the polymer compound, the weight W2 of the electrolytic solution is optimized with respect to the weight W1 of the polymer compound. As a result, higher ionic conductivity is obtained in the electrolyte layer 16, and the physical strength (shape stability) of the electrolyte layer 16 is further improved, so that even if the secondary battery is charged and discharged, the discharge capacity is further unlikely to decrease.

As described herein, the weight W1 is a weight of the polymer compound including the specific copolymer. That is, when the polymer compound includes only the specific copolymer, a W1 of the polymer compound is the weight of the specific copolymer. On the other hand, when the polymer compound includes another polymer described later together with the specific copolymer, the weight W1 of the polymer compound is the sum of the weight of the specific copolymer and the weight of another polymer.

Although the weight average molecular weight of the specific copolymer is not particularly limited, it is preferably from 550,000 to 1,200,000. This is because the weight average molecular weight of the specific copolymer is optimized, so that higher ionic conductivity is obtained in the electrolyte layer 16 and the physical strength of the electrolyte layer 16 is further improved.

As described above, the kind of the specific copolymer may be one kind or two or more kinds. In particular, it is preferable to use two or more of specific copolymers. In this case, the weight average molecular weights of the two or more of specific copolymers may be different from each other, or the copolymerization amounts of hexafluoropropylene in the two or more of specific copolymers may be different from each other. This is because the role of increasing the ionic conductivity of the electrolyte layer 16 and the role of improving the physical strength of the electrolyte layer 16 are shared (compatible) with each other by two or more of specific copolymers having different weight average molecular weights or copolymerization amounts of hexafluoropropylene. As a result, higher ionic conductivity is obtained in the electrolyte layer 16, and the physical strength of the electrolyte layer 16 is further improved.

A first ratio W2/W1 for the positive electrode side electrolyte layer 16A and a second ratio W2/W1 for the negative electrode side electrolyte layer 16B may be the same or different from each other. In particular, it is preferable that the first ratio W2/W1 for the positive electrode side electrolyte layer 16A and the second ratio W2/W1 for the negative electrode side electrolyte layer 16B are different from each other. This is because the advantages described below can be obtained.

When the first ratio W2/W1 for the positive electrode side electrolyte layer 16A is larger than the second ratio W2/W1 for the negative electrode side electrolyte layer 16B, a good film is formed on a surface of the positive electrode 13 during charging and discharging, and therefore, decomposition reaction of the electrolytic solution and the like are less likely to occur. In this case, although the first ratio W2/W1 for the positive electrode side electrolyte layer 16A is not particularly limited as long as it is larger than the second ratio W2/W1 for the negative electrode side electrolyte layer 16B, it is 4 to 50, for example. On the other hand, although the second ratio W2/W1 for the negative electrode side electrolyte layer 16B is not particularly limited as long as it is smaller than the first ratio W2/W1 for the positive electrode side electrolyte layer 16A, it is 2.5 or more and less than 4, for example.

When the second ratio W2/W1 for the negative electrode side electrolyte layer 16B is larger than the first ratio W2/W1 for the positive electrode side electrolyte layer 16A, the ionic conductivity of the negative electrode side electrolyte layer 16B is improved, so that lithium is less likely to be precipitated during charging and discharging. In this case, although the second ratio W2/W1 for the negative electrode side electrolyte layer 16B is not particularly limited as long as it is larger than the first ratio W2/W1 for the positive electrode side electrolyte layer 16A, it is 4 to 50, for example. On the other hand, although the first ratio W2/W1 for the positive electrode side electrolyte layer 16A is not particularly limited as long as it is smaller than the second ratio W2/W1 for the negative electrode side electrolyte layer 16B, it is 2.5 or more and less than 4, for example.

In order to examine the composition of the specific copolymer, for example, the following method may be used. First, the electrolyte layer 16 is taken out by disassembling the secondary battery. Subsequently, the polymer compound (specific copolymer) is extracted from the electrolyte layer 16 by a reprecipitation method. Finally, the specific copolymer is analyzed using an analysis method such as a nuclear magnetic resonance (NMR) method. This makes it possible to specify the composition of the specific copolymer. That is, it is possible to specify the kind (composition) of two or more compounds (monomers) contained as components in the specific copolymer and to specify the copolymerization amount of each component in the specific copolymer.

To obtain the ratio W2/W1, for example, the following method may be used. First, the electrolyte layer 16 is taken out by disassembling the secondary battery. Subsequently, the weight W1 of the polymer compound contained in the electrolyte layer 16 and the weight W2 of the electrolytic solution are measured by using a thermal analysis method such as thermogravimetry (TG). In this case, the electrolytic solution contained in the electrolyte layer 16 is volatilized by heating the electrolyte layer 16 to the volatilization temperature of the electrolytic solution (for example, 210° C.), and then the polymer compound contained in the electrolyte layer 16 is decomposed by heating the electrolyte layer 16 to the decomposition temperature of the polymer compound (for example, 550° C.). Finally, the ratio W2/W1 is calculated based on the weight W1 of the polymer compound and the weight W2 of the electrolytic solution.

The specific copolymer may further contain one or more of other components. The "other components" are components other than the foregoing vinylidene fluoride and hexafluoropropylene.

The kind of the other components is not particularly limited as long as the other components are compounds including an unsaturated bond for polymerization reaction. Specific examples of the other components include monomethyl maleate, trifluoroethylene, tetrafluoroethylene, and chlorotrifluoroethylene. This is because higher ionic conductivity is obtained in the electrolyte layer 16, and, at the same time, the physical strength of the electrolyte layer 16 is further improved. The copolymerization amount of the other components in the specific copolymer is not particularly limited.

The polymer compound may contain one or more of other polymers together with the foregoing specific copolymer. The other polymers are, for example, polymers not containing both of the foregoing vinylidene fluoride and hexafluoropropylene as components, and may be homopolymers or copolymers.

Examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate.

Examples of the copolymer include a copolymer containing vinylidene fluoride and monomethyl maleate as components.

The electrolytic solution contains a solvent and an electrolyte salt. However, the electrolytic solution may further contain one or more of other materials such as additives.

The solvent contains one or more of nonaqueous solvents such as organic solvents. The electrolytic solution containing the nonaqueous solvent is a so-called nonaqueous electrolytic solution.

Examples of the nonaqueous solvent include carbonate esters (cyclic carbonate ester and chain carbonate ester), lactone, a chain carboxylic ester, and nitrile. The nonaqueous solvents make it possible to achieve, for example, superior battery capacity, superior cycle characteristics, and superior storage characteristics. Example of the cyclic carbonate esters include ethylene carbonate, propylene carbonate, and butylene carbonate, and examples of the chain carbonate esters include dimethyl carbonate, diethyl carbonate, ethyl methyl carbonate, and methyl propyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

Other than the materials mentioned above, examples of the nonaqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to achieve similar advantages.

In particular, the carbonate ester preferably contains one or more of ethylene carbonate, propylene carbonate, dimethyl carbonate, diethyl carbonate, and ethyl methyl carbonate. These materials make it possible to achieve, for example, further superior battery capacity, further superior cycle characteristics, and further superior storage characteristics. In this case, a combination of a high-viscosity (high dielectric constant) solvent (having, for example, specific dielectric constant $\varepsilon \geq 30$) such as ethylene carbonate and propylene carbonate and a low-viscosity solvent (having, for example, viscosity $\leq 1$ mPa·s) such as dimethyl carbonate, ethylmethyl carbonate, and diethyl carbonate is more preferable. The combination makes it possible to improve the dissociation property of the electrolyte salt and ion mobility.

In particular, the nonaqueous solvent may contain one or more of an unsaturated cyclic carbonate ester, a halogenated carbonate ester, a sulfonate ester, an acid anhydride, a dinitrile compound, a diisocyanate compound, a phosphoric ester, and the like. This makes it possible to improve the chemical stability of the electrolytic solution.

An unsaturated cyclic carbonate ester is a cyclic carbonate ester including one or more unsaturated bonds (carbon-carbon double bonds or carbon-carbon triple bonds). Examples of the unsaturated cyclic carbonate ester include vinylene carbonate (1,3-dioxol-2-one), vinylethylene carbonate (4-vinyl-1,3-dioxolan-2-one), and methyleneethylene carbonate (4-methylene-1,3-dioxolan-2-one). A content of the unsaturated cyclic carbonate ester in the nonaqueous solvent is not particularly limited; however, the content is, for example, from 0.01 wt % to 10 wt %.

The halogenated carbonate ester is a cyclic carbonate ester having one or more halogens as constituent elements or a chain carbonate ester having one or more halogens as constituent elements. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. A content of the halogenated carbonate ester in the nonaqueous solvent is not particularly limited; however, the content is, for example, from 0.01 wt % to 50 wt %.

Examples of the sulfonate ester include 1,3-propane sultone and 1,3-propene sultone. A content of the sulfonate ester in the nonaqueous solvent is not particularly limited; however, the content is, for example, from 0.5 wt % to 5 wt %.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. A content of the acid anhydride in the nonaqueous solvent is not particularly limited; however, the content is, for example, from 0.5 wt % to 5 wt %.

Examples of the dinitrile compound include a compound represented by $NC-C_mH_{2m}-CN$ (m is an integer of not less than 1). Examples of the dinitrile compound include succinonitrile ($NC-C_2H_4-CN$), glutaronitrile ($NC-C_3H_6-CN$), adiponitrile ($NC-C_4H_8-CN$), and phthalonitrile ($NC-C_6H_4-CN$). A content of the dinitrile compound in the nonaqueous solvent is not particularly limited; however, the content is, for example, from 0.5 wt % to 5 wt %.

Examples of the diisocyanate compound include a compound represented by $OCN-C_nH_{2n}-NCO$ (n is an integer of not less than 1). Examples of the diisocyanate compound include hexamethylene diisocyanate ($OCN-C_6H_{12}-NCO$). A content of the diisocyanate compound in the nonaqueous solvent is not particularly limited; however, the content is, for example, from 0.5 wt % to 5 wt %.

Examples of the phosphoric ester include trimethyl phosphate and triethyl phosphate. A content of the phosphoric ester in the nonaqueous solvent is not particularly limited; however, the content is, for example, from 0.5 wt % to 5 wt %.

The electrolyte salt contains, for example, one or more of salts such as lithium salts. However, the electrolyte salt may contain a salt other than the lithium salt. Examples of the salt other than the lithium salt include a light metal salt other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). The nonaqueous solvents make it possible to achieve, for example, superior battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to lower internal resistance, thereby achieving a higher effect.

A content of the electrolyte salt is not particularly limited; however, the content is preferably from 0.3 mol/kg to 3.0 mol/kg with respect to the solvent. High ion conductivity is achievable in this range.

The electrolyte layer 16 includes a plurality of inorganic particles because the safety of the secondary battery is improved. Specifically, when the electrolyte layer 16 includes the plurality of inorganic particles, the separator 15 is less likely to be oxidized during charging and discharging of the secondary battery. Accordingly, short circuit tends not to occur between the positive electrode 13 and the negative electrode 14, so that the safety of the secondary battery is improved.

The plurality of inorganic particles contain, for example, one or more of inorganic materials such as a ceramic material (insulating material). The ceramic material is, for example, a metal oxide such as aluminum oxide ($Al_2O_3$), zirconium oxide ($ZrO_2$), titanium oxide ($TiO_2$) and magnesium oxide ($MgO_2$). This is because oxidation of the separator 15 is sufficiently suppressed, so that occurrence of short circuit is sufficiently suppressed.

Here, although a ratio W3/W1 of a weight W3 of the plurality of inorganic particles to the weight W1 of the polymer compound including the specific copolymer is not particularly limited, in particular, the ratio W3/W1 is preferably 0.7 to 5. This is because when the electrolyte layer 16 includes the plurality of inorganic particles together with the electrolytic solution and the polymer compound, the weight W3 of the plurality of inorganic particles is optimized with respect to the weight W1 of the polymer compound. As a result, higher ionic conductivity is obtained in the electrolyte layer 16, and the physical strength (shape stability) of the electrolyte layer 16 is further improved, so that even if the secondary battery is charged and discharged, the discharge capacity is further unlikely to decrease.

The ratio W3/W1 for the positive electrode side electrolyte layer 16A and the ratio W3/W1 for the negative electrode side electrolyte layer 16B may be the same or different from each other. That is, the ratio W3/W1 for the positive electrode side electrolyte layer 16A may be larger than the ratio W3/W1 for the negative electrode side electrolyte layer 16B, or the ratio W3/W1 for the positive electrode side electrolyte layer 16A may be smaller than the ratio W3/W1 for the negative electrode side electrolyte layer 16B.

The average particle diameter (median diameter D50) and specific surface area (BET specific surface area) of the plurality of inorganic particles are not particularly limited. Specifically, the average particle diameter is, for example, 0.1 μm to 2.5 μm. The specific surface area is, for example, 0.5 $m^2$/g to 11 $m^2$/g.

Although the content of the plurality of inorganic particles in the electrolyte layer 16 is not particularly limited, it is preferable that the ratio W3/W1 is set within the foregoing appropriate range.

To obtain the ratio W3/W1, for example, the following method may be used. First, after the electrolyte layer 16 is taken out from the secondary battery, a weight W4 of the electrolyte layer 16 is measured. Subsequently, the weight W1 of the polymer compound contained in the electrolyte layer 16 and the weight W2 of the electrolytic solution are measured using a thermal analysis method in the same procedure as in the case where the ratio W2/W1 is obtained. Subsequently, the weight W3 of the plurality of inorganic particles is measured by subtracting the weight W1 of the polymer compound and the weight W2 of the electrolytic solution from the weight W4 of the electrolyte layer 16. Finally, the ratio W3/W1 is calculated based on the weight W1 of the polymer compound and the weight W3 of the plurality of inorganic particles.

The secondary battery operates, for example, as follows.

During charging, when lithium ions are extracted from the positive electrode 13, the lithium ions are inserted in the negative electrode 14 through the electrolyte layer 16. On the other hand, during discharging, when lithium ions are extracted from the negative electrode 14, the lithium ions are inserted in the positive electrode 13 through the electrolyte layer 16.

The secondary battery including the electrolyte layer 16 is manufactured, for example, by one of the following three procedures.

In the first procedure, for example, as will be described later, after fabricating the positive electrode 13 and the negative electrode 14 and forming the electrolyte layer 16, the secondary battery is assembled. The procedure of fabricating the positive electrode 13 and the negative electrode 14 described in the first procedure is the same as in the second procedure and the third procedure which will be described later.

When fabricating the positive electrode 13, first, the positive electrode active material is, as necessary, mixed with the positive electrode binder, the positive electrode conductive agent, and the like to obtain a positive electrode mixture. Subsequently, the positive electrode mixture is dispersed or dissolved in, for example, an organic solvent to obtain a paste-like positive electrode mixture slurry. Finally, both surfaces of the positive electrode current collector 13A are coated with the positive electrode mixture slurry, and thereafter, the coated positive electrode mixture slurry is dried to form the positive electrode active material layer 13B. Thereafter, the positive electrode active material layer 13B may be compression-molded with use of, for example, a roll pressing machine. In this case, the compression molding processing may be performed while heating the positive electrode active material layer 13B, or the compression molding processing may be repeated a plurality of times.

When fabricating the negative electrode 14, the negative electrode active material layers 14B are formed on both surfaces of the negative electrode current collector 14A by the production procedure that is the same as in the positive electrode 13. Specifically, a negative electrode mixture in which the negative electrode active material, the negative electrode binder, and the negative electrode conductive agent are mixed is dispersed or dissolved in, for example, an organic solvent to obtain a paste-like negative electrode mixture slurry. Subsequently, the negative electrode mixture slurry is coated on both surfaces of the negative electrode current collector 14A and then dried to form the negative electrode active material layer 14B, and then, if necessary, the negative electrode active material layer 14B is compression-molded with use of, for example, a roll pressing machine.

When the electrolyte layer 16 is formed, first, an electrolytic solution is prepared by dissolving or dispersing an electrolyte salt or the like in a solvent. Subsequently, after an electrolytic solution, a polymer compound including a specific copolymer, a plurality of inorganic particles, optionally a diluting solvent (for example, an organic solvent) and the like are mixed, the mixture is stirred, whereby a sol precursor solution is prepared.

In the case of obtaining the specific copolymer, for example, a raw material containing two kinds of monomers (vinylidene fluoride and hexafluoropropylene) is used and subjected to polymerization reaction. This provides the specific copolymer containing vinylidene fluoride and hexafluoropropylene as components. In this case, the copolymerization amount of each component in the specific copolymer can be adjusted according to an input amount of each raw material.

Finally, the surface of the positive electrode 13 (positive electrode active material layer 13B) is coated with the precursor solution, and the coated precursor solution is dried to form the gel electrolyte layer 16 (positive electrode side electrolyte layer 16A). On the other hand, the surface of the negative electrode 14 (negative electrode active material layer 14B) is coated with the precursor solution, and the coated precursor solution is dried to form the gel electrolyte layer 16 (negative electrode side electrolyte layer 16B).

In the case where the secondary battery is assembled, first, the positive electrode lead 11 is attached to the positive electrode current collector 13A by, for example, a welding method, and the negative electrode lead 12 is attached to the negative electrode current collector 14A by, for example, a welding method. Subsequently, the positive electrode 13 and the negative electrode 14 stacked with the separator 15 and the electrolyte layer 16 interposed therebetween are spirally wound to fabricate the spirally wound electrode body 10. Subsequently, the protective tape 17 is attached onto the outermost periphery of the spirally wound electrode body 10. Finally, the outer package member 20 is folded to interpose the spirally wound electrode body 10, and thereafter, the outer edges of the outer package member 20 are bonded by, for example, a thermal fusion bonding method to enclose the spirally wound electrode body 10 in the outer package member 20. In this case, the close-contact film 21 is inserted between the positive electrode lead 11 and the outer package member 20, and the close-contact film 21 is inserted between the negative electrode lead 12 and the outer package member 20.

In the second procedure, the positive electrode lead 11 is attached to the positive electrode 13, and the negative electrode lead 12 is attached to the negative electrode 14. Subsequently, the positive electrode 13 and the negative electrode 14 stacked with the separator 15 interposed therebetween are spirally wound to fabricate a spirally wound body as a precursor of the spirally wound electrode body 10. Subsequently, the protective tape 17 is attached onto the outermost periphery. Subsequently, the outer package member 20 is folded to interpose the spirally wound body, and thereafter, the outer edges of the outer package member 20 are bonded by, for example, a thermal fusion bonding method to store the spirally wound body in the outer package member 20. Subsequently, the electrolytic solution, a raw material of a polymer compound (including two kinds of monomers which are raw materials of the specific copolymer), the plurality of inorganic particles, and, as necessary, other materials such as a polymerization initiator and a polymerization inhibitor are mixed to prepare a composition for electrolyte. Subsequently, the composition for electrolyte is injected into the pouch-like outer package member 20, and thereafter, the pouch-like outer package member 20 is hermetically sealed by, for example, a thermal fusion bonding method. Subsequently, a polymer compound containing a specific copolymer is formed by thermally polymerizing the raw material of the polymer compound. Accordingly, the polymer compound is impregnated with the electrolytic solution, and the polymer compound is gelated, thus forming the electrolyte layer 16.

In the third procedure, a spirally wound body is fabricated by the same procedure as in the foregoing second procedure, and is then contained inside the pouch-like outer package member 20, except that the separator 15 having on its both sides the polymer compound layers including the specific copolymer and a plurality of inorganic particles is used. When the polymer compound layer is formed, a solution in which the polymer compound including the specific copolymer and the plurality of inorganic particles are dispersed in an organic solvent or the like is applied to both surfaces of the separator 15, and then the solution is dried. Subsequently, the electrolytic solution is injected into the outer package member 20, and thereafter, a cavity of the outer package member 20 is hermetically sealed by, for example, a thermal fusion bonding method. Subsequently, the outer package member 20 is heated while a weight is applied to the outer package member 20 to bring the separator 15 into close contact with the positive electrode 13 and the negative electrode 14 with the polymer compound layer interposed therebetween. Accordingly, the polymer compound in the polymer compound layer is impregnated with the electrolytic solution, and the polymer compound is gelated, thus forming the electrolyte layer 16.

In the third procedure, swollenness of the secondary battery is suppressed as compared with the first procedure. Further, in the third procedure, a monomer, a solvent, or the like as the raw material of the polymer compound is hardly left in the electrolyte layer 16, as compared with the second procedure, and therefore, the formation process of the polymer compound is favorably controlled. Thus, each of the positive electrode 13, the negative electrode 14, and the separator 15 is in sufficiently close contact with the electrolyte layer 16.

According to an embodiment of the present disclosure, the electrolyte layer 16 includes the plurality of inorganic particles together with the electrolytic solution and the polymer compound. This polymer compound includes the specific copolymer, and the ratio W2/W1 of the weight W2 of the electrolytic solution to the weight W1 of the polymer compound is 2.5 to 50.

In this case, as described above, when the electrolyte layer 16 includes the plurality of inorganic particles together with the electrolytic solution and the polymer compound, the weight W2 of the electrolytic solution is optimized with respect to the weight W1 of the polymer compound. As a result, significantly high ionic conductivity is obtained in the electrolyte layer 16, and the physical strength (shape stability) of the electrolyte layer 16 is significantly improved, so that even if the secondary battery is charged and discharged, the discharge capacity is significantly unlikely to decrease. Thus, excellent battery characteristics can be obtained.

In particular, when the ratio W3/W1 of the weight W3 of the plurality of inorganic particles to the weight W1 of the polymer compound is 0.7 to 5, the weight W3 of the plurality of inorganic particles is optimized with respect to the weight W1 of the polymer compound. Thus, higher ionic conductivity is obtained in the electrolyte layer 16, and the physical strength of the electrolyte layer 16 is further improved, so that a higher effect can be obtained.

When the copolymerization amount of hexafluoropropylene in the specific copolymer is 1.5 wt % to 7.5 wt % or the weight average molecular weight of the specific copolymer is 550,000 to 1,200,000, sufficient Ionic conductivity and sufficient physical strength can be obtained for the electrolyte layer 16.

When the electrolyte layer 16 includes two or more specific copolymers (two or more specific copolymers having different weight average molecular weights or two or more specific copolymers having different copolymerization amounts of hexafluoropropylene), a higher effect can be obtained.

When the ratio W2/W1 for the positive electrode side electrolyte layer 16A is different from the ratio W2/W1 for the negative electrode side electrolyte layer 16B, a higher effect can be obtained.

When the plurality of inorganic particles contain aluminum oxide or the like, sufficient safety can be obtained in the secondary battery, and therefore, a higher effect can be obtained.

Next, description is given on application examples of the foregoing secondary battery.

Applications of a secondary battery are not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the secondary battery is used as the auxiliary electric power source, the kind of the main electric power source is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile lifestyle electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications described above.

In particular, the secondary battery is effectively applicable to the battery pack, the electric vehicle, the electric power storage system, the electric power tool, the electronic apparatus, or the like. The reason for this is that since superior battery characteristics are demanded in these applications, performance can be effectively improved with use of the secondary battery of the present technology. The battery pack is an electric power source including the secondary battery. As will be described later, the battery pack may include a single battery or an assembled battery. The electric vehicle is a vehicle that works (runs) with use of the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power is accumulated in the secondary battery as an electric power storage source, and therefore, home electric products and the like can be used using the electric power. The electric power tool is a tool in which a movable section (such as a drill) is allowed to move with use of the secondary battery as a driving electric power source. The electronic apparatus is an apparatus executing various functions with use of the secondary battery as a driving electric power source (electric power supply source).

Herein, specific description is given on some application examples of the secondary battery. The configurations of the application examples explained below are merely examples, and may be changed as appropriate.

Figure 3:
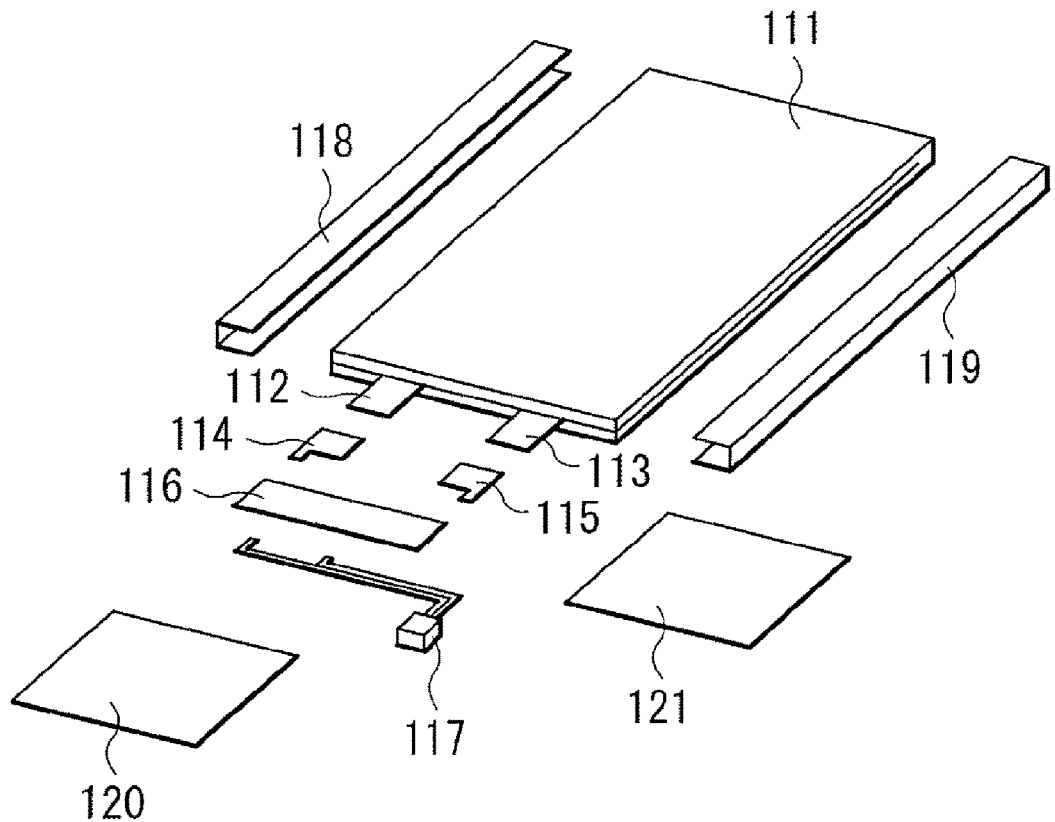
FIG. 3 is a perspective view illustrating a configuration of an application example (a battery pack: single battery) of the secondary battery according to an embodiment of the present technology.
Figure 4:
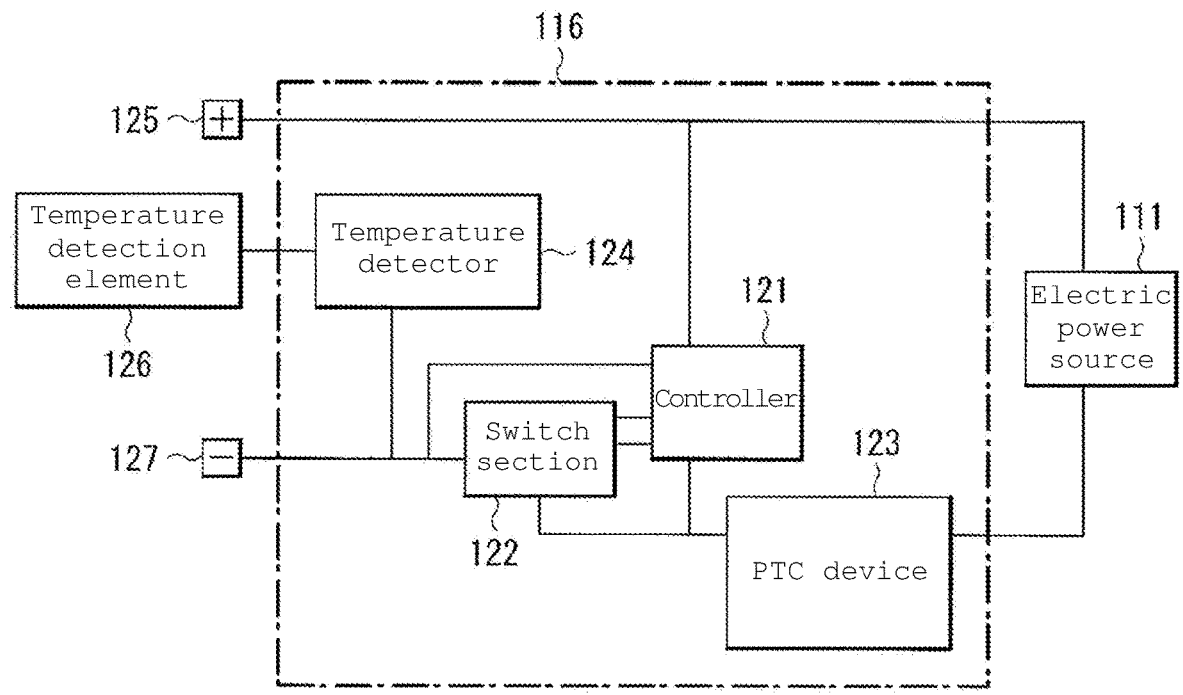
FIG. 4 is a block diagram illustrating a configuration of the battery pack illustrated in FIG. 3.

FIG. 3 illustrates a perspective configuration of a battery pack including a single battery according to an embodiment. FIG. 4 illustrates a block configuration of the battery pack shown in FIG. 3. FIG. 3 illustrates a state that the battery pack is disassembled.

The battery back described herein is a simple battery pack including the secondary battery of the present technology (a so-called soft pack), and is mounted in, for example, an electronic apparatus typified by a smartphone. For example, the battery pack includes an electric power source 111 that is a laminated-film-type secondary battery, and a circuit board 116 coupled to the electric power source 111, as illustrated in FIG. 3. A positive electrode lead 112 and a negative electrode lead 113 are attached to the electric power source 111.

A pair of adhesive tapes 118 and 119 is attached to both side surfaces of the electric power source 111. A protection circuit module (PCM) is formed in the circuit board 116. The circuit board 116 is coupled to the positive electrode 112 through a tab 114, and is coupled to a negative electrode lead 113 through a tab 115. Moreover, the circuit board 116 is coupled to a lead 117 provided with a connector for external connection. While the circuit board 116 is coupled to the electric power source 111, the circuit board 116 is protected by a label 120 and an insulating sheet 121. The label 120 is attached to fix, for example, the circuit board 116 and the insulating sheet 121.

Moreover, for example, the battery pack includes the electric power source 111 and the circuit board 116 as illustrated in FIG. 4. The circuit board 116 includes, for example, a controller 121, a switch section 122, a PTC device 123, and a temperature detector 124. The electric power source 111 is allowed to be coupled to outside through a positive electrode terminal 125 and a negative electrode terminal 127, so that the electric power source 111 is charged and discharged through the positive electrode terminal 125 and the negative electrode terminal 127. The temperature detector 124 detects a temperature with use of a temperature detection terminal (a so-called T terminal) 126.

The controller 121 controls an operation of the entire battery pack (including a used state of the electric power source 111). The controller 121 includes, for example, a central processing unit (CPU) or a processor and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an overdischarge detection voltage, the controller 121 causes the switch section 122 to be disconnected so that a discharge current does not flow into a current path of the electric power source 111. Moreover, for example, in the case where a large current flows during discharging, the controller 121 causes the switch section 122 to be disconnected, thereby blocking the discharge current.

The overcharge detection voltage is, for example, 4.2 V±0.05 V, and the overdischarge detection voltage is, for example, 2.4 V±0.1 V.

The switch section 122 switches the used state of the electric power source 111, that is, whether or not the electric power source 111 is allowed to be coupled to an external device in accordance with an instruction from the controller 121. The switch section 122 includes, for example, a charge control switch and a discharge control switch. The charge control switch and the discharge control switch are each, for example, a semiconductor switch such as a field-effect transistor (MOSFET) using a metal oxide semiconductor. Charge and discharge currents are detected based on on-resistance of the switch section 122.

The temperature detector 124 measures a temperature of the electric power source 111, and outputs a measurement result of the temperature to the controller 121. The temperature detector 124 includes, for example, a temperature detection element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

Figure 5:
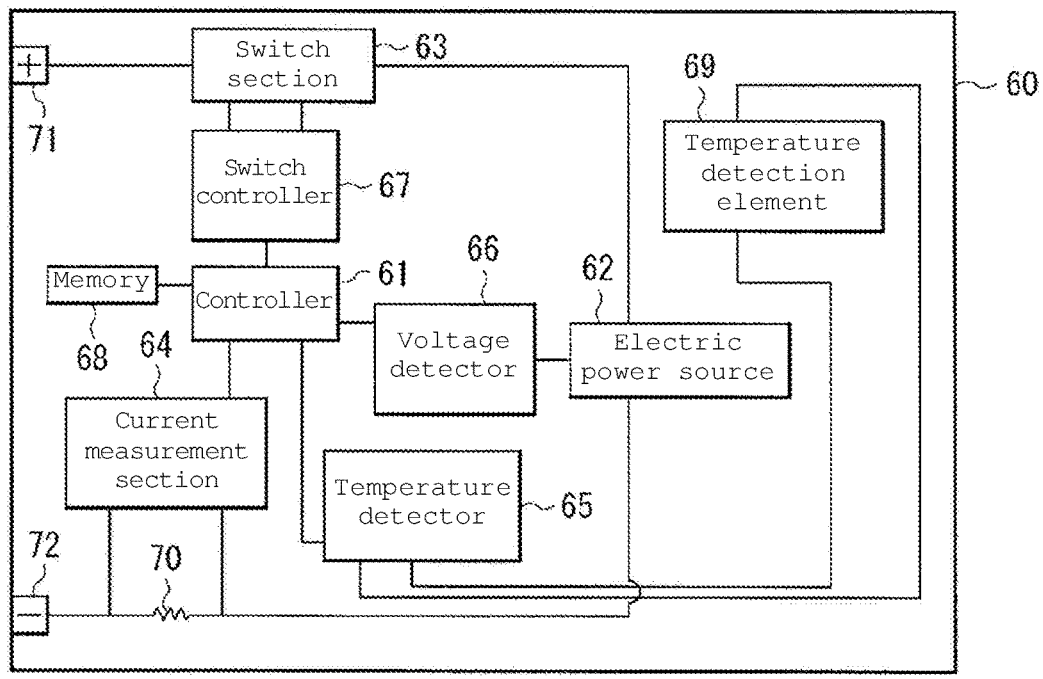
FIG. 5 is a block diagram illustrating a configuration of an application example (a battery pack: assembled battery) of the secondary battery according to an embodiment of the present technology.

FIG. 5 illustrates a block configuration of a battery pack including an assembled battery according to an embodiment.

For example, the battery pack includes a controller 61, an electric power source 62, a switch section 63, a current measurement section 64, a temperature detector 65, a voltage detector 66, a switch controller 67, a memory 68, a temperature detection element 69, a current detection resistance 70, a positive electrode terminal 71, and a negative electrode terminal 72 in a housing 60. The housing 60 contains, for example, a plastic material.

The controller 61 controls an operation of the entire battery pack (including a used state of the electric power source 62). The controller 61 includes, for example, a CPU or a processor. The electric power source 62 is an assembled battery including two or more secondary batteries of the present technology, and the two or more secondary batteries may be connected in series, in parallel, or in series-parallel combination. As an example, the electric power source 62 includes six secondary batteries in which two sets of series-connected three batteries are connected in parallel to each other.

The switch section 63 switches the used state of the electric power source 62, that is, whether or not the electric power source 62 is allowed to be coupled to an external device, in accordance with an instruction of the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current with use of the current detection resistance 70, and outputs a measurement result of the current to the controller 61. The temperature detector 65 measures temperature with use of the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls an operation of the switch section 63 in accordance with signals inputted respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charging current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharging current.

The overcharge detection voltage is, for example, 4.2 V±0.05 V, and the overdischarge detection voltage is, for example, 2.4 V±0.1 V.

The memory 68 includes, for example, an EEPROM as a non-volatile memory. The memory 68 holds, for example, numerical values calculated by the controller 61 and information of the secondary battery measured in a manufacturing process (such as an internal resistance in an initial state). In the case where the memory 68 holds full charge capacity of the secondary battery, the controller 61 is allowed to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

Figure 6:
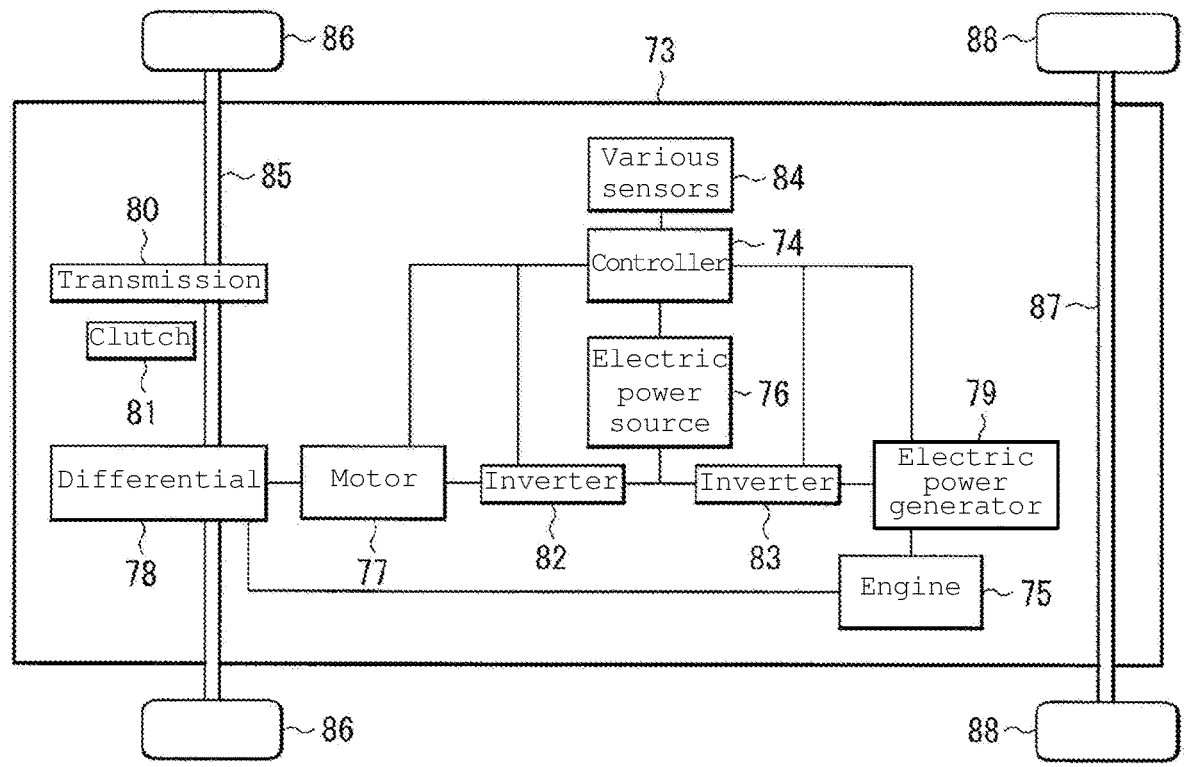
FIG. 6 is a block diagram illustrating a configuration of an application example (an electric vehicle) of the secondary battery according to an embodiment of the present technology.

FIG. 6 illustrates a block configuration of a hybrid automobile as an example of an electric vehicle according to an embodiment.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle can be run with use of one of the engine 75 and the motor 77 as a drive source, for example. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. Since the torque of the engine 75 is transferred to the electric power generator 79, the electric power generator 79 generates alternating-current electric power with use of the torque, and since the alternating-current electric power is converted into direct-current electric power through the inverter 83, the direct-current electric power is accumulated in the electric power source 76. In contrast, in the case where the motor 77 as a conversion section is used as a power source, electric power (direct-current electric power) supplied from the electric power source 76 is converted into alternating-current electric power through the inverter 82, and therefore, the motor 77 is driven with use of the alternating-current electric power. Drive power (torque) obtained by converting the electric power by the motor 77 is transferred to the front tire 86 and the rear tire 88 through the differential 78, the transmission 80, and the clutch 81 as the drive sections, for example.

When speed of the electric vehicle is reduced by a brake mechanism, resistance at the time of speed reduction is transferred to the motor 77 as torque, and thus the motor 77 may generate alternating-current electric power by utilizing the torque. It is preferable that the alternating-current electric power is converted into direct-current electric power through the inverter 82, and thus the direct-current regenerative electric power is accumulated in the electric power source 76.

The controller 74 controls an operation of the entire electric vehicle. The controller 74 includes, for example, a CPU. The electric power source 76 includes one or more secondary batteries of the present technology. The electric power source 76 is coupled to an external power source, and the power source 76 is allowed to accumulate electric power by receiving electric power supply from the external electric power source. The various sensors 84 are used, for example, for controlling the number of revolutions of the engine 75 and for controlling opening level (throttle opening level) of a throttle valve. The various sensors 84 include, for example, one or more of a speed sensor, an acceleration sensor, and an engine frequency sensor.

The description has been given above on a case where the electric vehicle is the hybrid automobile; however, the electric vehicle may be a vehicle (an electric automobile) that works with use of only the electric power source 76 and the motor 77 without using the engine 75.

Figure 7:
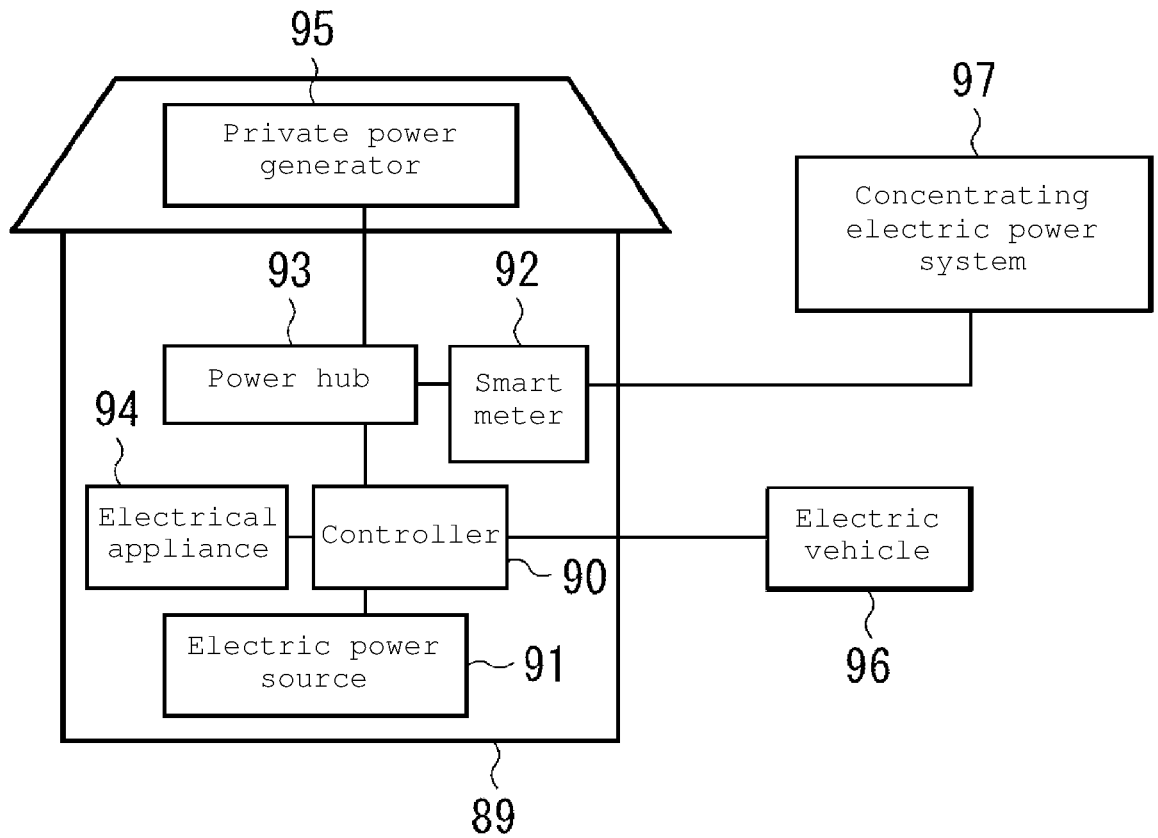
FIG. 7 is a block diagram illustrating a configuration of an application example (an electric power storage system) of the secondary battery according to an embodiment of the present technology.

FIG. 7 illustrates a block configuration of an electric power storage system according to an embodiment.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be allowed to be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power system 97 through the smart meter 92 and the power hub 93.

The electrical appliance 94 includes, for example, one or more home electric products such as a refrigerator, an air conditioner, a television, and a water heater. The private power generator 95 includes, for example, one or more of a solar power generator, a wind-power generator, and the like. The electric vehicle 96 includes, for example, one or more of an electric automobile, an electric motorcycle, a hybrid automobile, and the like. The concentrating electric power system 97 includes, for example, one or more of a thermal power plant, an atomic power plant, a hydraulic power plant, a wind-power plant, and the like.

The controller 90 controls an operation of the entire electric power storage system (including a used state of the electric power source 91). The controller 90 includes, for example, a CPU. The electric power source 91 includes one or more secondary batteries of the present technology. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows for effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, so that the electrical appliance 94 becomes operable, and the electric vehicle 96 becomes chargeable. In other words, the electric power storage system is a system that makes it possible to accumulate and supply electric power in the house 89 with use of the electric power source 91.

The electric power accumulated in the electric power source 91 is usable as required. Thus, for example, electric power is accumulated in the electric power source 91 from the concentrating electric power system 97 in the middle of night when an electric rate is inexpensive, and the electric power accumulated in the electric power source 91 may be used during daytime hours when the electric rate is expensive.

The foregoing electric power storage system may be provided for each household (family unit), or may be provided for a plurality of households (a plurality of family units).

Figure 8:
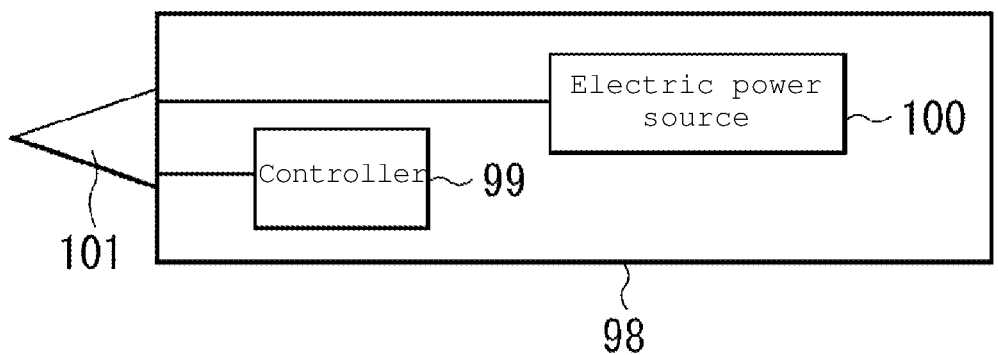
FIG. 8 is a block diagram illustrating a configuration of an application example (an electric power tool) of the secondary battery according to an embodiment of the present technology.

FIG. 8 illustrates a block configuration of an electric power tool.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls an operation of the entire electric power tool (including a used state of the electric power source 100). The controller 99 includes, for example, a CPU. The electric power source 100 includes one or more secondary batteries of the present technology. The controller 99 allows electric power to be supplied from the electric power source 100 to the drill section 101 in accordance with an operation by an operation switch.

EXAMPLES

According to some embodiments, examples of the present technology will be described in detail.

Experimental Examples 1 to 18

A laminated-film-type lithium ion secondary battery illustrated in FIGS. 1 and 2 was fabricated by the following procedure.

In the case of fabricating the positive electrode 13, first, 90 parts by mass of a positive electrode active material ($LiCoO_2$), 5 parts by mass of a positive electrode binder (polyvinylidene fluoride), and 5 parts by mass of a positive electrode conductive agent (ketjen black) were mixed to obtain a positive electrode mixture. Subsequently, the positive electrode mixture was dispersed in an organic solvent (N-methyl-2-pyrrolidone) to obtain a paste-like positive electrode mixture slurry. Subsequently, both surfaces of the positive electrode current collector 13A (an aluminum foil having a thickness of 15 μm) were coated with the positive electrode mixture slurry with use of a coating apparatus, and thereafter, the positive electrode mixture slurry was dried to form the positive electrode active material layer 13B. Finally, the positive electrode active material layer 13B was compression-molded with use of a roll pressing machine, and then the positive electrode current collector 13A having the positive electrode active material layer 13B formed was cut into strips (48 mm×300 mm).

In the case of fabricating the negative electrode 14, first, 90 parts by mass of a negative electrode active material (artificial graphite) and 10 parts by mass of a negative electrode binder (polyvinylidene fluoride) were mixed to obtain a negative electrode mixture. Subsequently, the negative electrode mixture was dispersed in an organic solvent (N-methyl-2-pyrrolidone) to obtain a paste-like negative electrode mixture slurry. Subsequently, both surfaces of the negative electrode current collector 14A (a copper foil having a thickness of 15 μm) were coated with the negative electrode mixture slurry with use of a coating apparatus, and thereafter, the negative electrode mixture slurry was dried to form the negative electrode active material layer 14B. Finally, the negative electrode active material layer 14B was compression-molded with use of a roll pressing machine, and then the negative electrode current collector 14A having the negative electrode active material layer 14B formed was cut into strips (50 mm×310 mm).

In the case of forming the electrolyte layer 16, first, an electrolytic solution was prepared by dissolving an electrolyte salt ($LiPF_6$) in a solvent (ethylene carbonate and diethyl carbonate). In this case, the composition of the solvent was ethylene carbonate:diethyl carbonate=50:50 in weight ratio, and the content of the electrolyte salt in the solvent was 1 mol/kg.

Subsequently, the electrolytic solution, the polymer compounds (copolymers 1 and 2), and a plurality of inorganic particles (aluminum oxide, median diameter D50=0.5 μm) were mixed to prepare a mixture solution. Subsequently, the mixture solution was processed with use of a homogenizer to dissolve the polymer compound and disperse the plurality of inorganic particles, and thereafter, the processed mixture solution was stirred while being heated (75° C.). Subsequently, the mixture solution was further stirred (for 30 minutes to 1 hour), thereby preparing a sol precursor solution.

Details (copolymerization amount (wt %), weight average molecular weight Mw) of the polymer compounds (copolymers 1 and 2) are as shown in Table 1. Vinylidene fluoride (VDF) and hexafluoropropylene (HFP) were used as raw materials (monomers) of the polymer compound. As the polymer compound, only the copolymer 1 was used, and the copolymers 1 and 2 were used in combination. As the copolymers 1 and 2, two kinds of copolymers having different weight average molecular weights or copolymerization amounts of hexafluoropropylene were also used.

In the case of preparing the precursor solution, a mixing ratio (weight ratio) of the polymer compounds (copolymers 1 and 2) and the electrolytic solution was adjusted such that the ratio W2/W1 became a desired value, and a mixing ratio (weight ratio) of the polymer compounds (copolymers 1 and 2) and the plurality of inorganic particles was adjusted such that the ratio W3/W1 became a desired value.

Finally, the surface of the positive electrode 13 was coated with the precursor solution, and the coated precursor solution was dried to form the gel electrolyte layer 16 (positive electrode side electrolyte layer 16A). On the other hand, the surface of the negative electrode 14 was coated with the precursor solution, and the coated precursor solution was dried to form the gel electrolyte layer 16 (negative electrode side electrolyte layer 16B). In this case, the configuration of the positive electrode side electrolyte layer 16A was the same as the configuration of the negative electrode side electrolyte layer 16B. Details of the electrolyte layer 16 (ratio W2/W1, ratio W3/W1) are as shown in Table 1.

In the case where the secondary battery is assembled, first, the positive electrode lead 11 was welded to the positive electrode current collector 13A, and the negative electrode lead 12 was welded to the negative electrode current collector 14A. Subsequently, the positive electrode 13 having the electrolyte layer 16 (positive electrode side electrolyte layer 16A) formed and the negative electrode 14 having the electrolyte layer 16 (negative electrode side electrolyte layer 16B) formed were stacked with the separator 15 (microporous polyethylene film having a thickness of 25 μm) interposed therebetween, and then the stack was spirally wound to obtain a spirally wound body. Subsequently, after the spirally wound body wound was spirally wound in the longitudinal direction, the protective tape 17 was attached onto the outermost periphery of the spirally wound body, thereby forming the spirally wound electrode body 10. Finally, the outer package member 20 was folded to interpose the spirally wound body 10, and thereafter, the outer edges of the outer package member 20 were thermally fused. As a result, the spirally wound electrode body 10 was enclosed in the outer package member 20. In this case, the close-contact film 21 was inserted between the positive electrode lead 11 and the outer package member 20, and the close-contact film 21 was inserted between the negative electrode lead 12 and the outer package member 20.

As a result, a laminated-film-type lithium secondary battery was completed.

In order to evaluate battery characteristics of the secondary battery, when the cycle characteristics of the secondary battery were examined, the results shown in Table 1 were obtained.

Upon examining the cycle characteristics, first, one cycle of charging and discharging was performed on the secondary battery in an ambient temperature environment (23° C.) so as to stabilize the state of the secondary battery. During charging, the secondary battery was charged at a constant current of 0.5 C until reaching the upper voltage of 4.3 V, and was then charged at a constant voltage of 4.3 V until the total charge time reached 3 hours. During discharging, the secondary battery was discharged at a constant current of 0.5 C until reaching the final voltage of 3V. "0.5 C" is a value of a current that causes the battery capacity (theoretical capacity) to be completely discharged in 2 hours.

Subsequently, one cycle of charging and discharging was performed on the secondary battery in a low temperature environment (0° C.) to measure a discharging capacity at the second cycle. Subsequently, charging and discharging were repeated until the total number of cycles reached 500 cycles in the same environment (0° C.) to measure a discharging capacity at the 500th cycle. During charging, the secondary battery was charged at a constant current of 2 C until reaching the upper voltage of 4.3 V, and was further charged at a constant voltage of 4.3 V until the total charge time reached 3 hours. During discharging, the secondary battery was discharged at a constant current of 2 C until reaching the final voltage of 3V. "2 C" is a value of a current that causes the battery capacity (theoretical capacity) to be completely discharged in 0.5 hours.

Finally, a capacitance retention rate (%)=(discharging capacity at the 500th cycle/discharging capacity at the second cycle)×100 was calculated.

TABLE 1

| Experimental Example | Copolymer 1 | | | | | Copolymer 2 | | | | | Capacitance retention rate (%) |
|---|---|---|---|---|---|---|---|---|---|---|---|
| | Copolymerization amount (wt %) | | | | | Copolymerization amount (wt %) | | | | | |
| | VDF | HFP | Mw | W2/W1 | W3/W1 | VDF | HFP | Mw | W2/W1 | W3/W1 | |
| 1 | 92.5 | 7.5 | 600,000 | 2.5 | 2 | — | — | — | — | — | 82 |
| 2 | 92.5 | 7.5 | 600,000 | 12 | 2 | — | — | — | — | — | 84 |
| 3 | 92.5 | 7.5 | 600,000 | 50 | 2 | — | — | — | — | — | 85 |
| 4 | 92.5 | 7.5 | 600,000 | 2.5 | 0.7 | — | — | — | — | — | 83 |
| 5 | 92.5 | 7.5 | 600,000 | 2.5 | 5 | — | — | — | — | — | 82 |
| 6 | 92.5 | 7.5 | 600,000 | 2.5 | 8 | — | — | — | — | — | 74 |
| 7 | 98.5 | 1.5 | 600,000 | 2.5 | 2 | — | — | — | — | — | 81 |
| 8 | 96 | 4 | 600,000 | 2.5 | 2 | — | — | — | — | — | 82 |
| 9 | 90 | 10 | 600,000 | 2.5 | 2 | — | — | — | — | — | 73 |
| 10 | 92.5 | 7.5 | 550,000 | 2.5 | 2 | — | — | — | — | — | 82 |
| 11 | 92.5 | 7.5 | 900,000 | 2.5 | 2 | — | — | — | — | — | 84 |
| 12 | 92.5 | 7.5 | 1200,000 | 2.5 | 2 | — | — | — | — | — | 84 |
| 13 | 92.5 | 7.5 | 1400,000 | 2.5 | 2 | — | — | — | — | — | 75 |

TABLE 1-continued

| | Copolymer 1 | | | | | Copolymer 2 | | | | | Capacitance retention |
|---|---|---|---|---|---|---|---|---|---|---|---|
| Experimental | Copolymerization amount (wt %) | | | | | Copolymerization amount (wt %) | | | | | |
| Example | VDF | HFP | Mw | W2/W1 | W3/W1 | VDF | HFP | Mw | W2/W1 | W3/W1 | rate (%) |
| 14 | 92.5 | 7.5 | 600,000 | 2.5 | 2 | 92.5 | 7.5 | 900,000 | 2.5 | 2 | 92 |
| 15 | 92.5 | 7.5 | 600,000 | 2.5 | 2 | 96 | 4 | 600,000 | 2.5 | 2 | 91 |
| 16 | 92.5 | 7.5 | 600,000 | 1 | 2 | — | — | — | — | — | 42 |
| 17 | 92.5 | 7.5 | 600,000 | 55 | 2 | — | — | — | — | — | 55 |
| 18 | 92.5 | 7.5 | 600,000 | 50 | — | — | — | — | — | — | 47 |

VDF: vinylidene fluoride,
HFP: hexafluoropropylene,
Mw: weight average molecular weight The cycle characteristics of the secondary battery greatly varied depending on the configuration of the electrolyte layer 16 as will be described later.

In the case of using the specific copolymer as the polymer compound (Experimental Examples 1 to 17), when the ratio W2/W1 was within the proper range (=2.5 to 50) (Experimental Examples 1 to 15), the capacitance retention rate increased greatly as compared with the case where the ratio W2/W1 was not within the proper range (Experimental Examples 16 and 17).

In particular, the following tendencies were found when the ratio W2/W1 was within the proper range.

First, when the electrolyte layer 16 contained the plurality of inorganic particles (Experimental Examples 1 and 4 to 6), the capacitance retention rate increased greatly as compared with the case where the electrolyte layer 16 did not contain the plurality of inorganic particles (Experimental Example 18). In this case, when the ratio W3/W1 was within the proper range (=0.7 to 5) (Experimental Examples 1, 4, and 5), the capacitance retention rate further increased.

Second, when the copolymerization amount of hexafluoropropylene in the specific copolymer was 1.5 wt % to 7.5 wt % (Experimental Examples 1, 7, and 8), the capacitance retention rate further increased.

Third, when the specific copolymer had a weight average molecular weight of 550,000 to 1,200,000 (Experimental Examples 1 and 10 to 12), the capacitance retention rate further increased.

Fourth, in the case of using two kinds of specific copolymers (Experimental Examples 14 and 15), the capacitance retention rate further increased as compared with the case of using one kind of specific copolymer (Experimental Examples 1, 8, and 11).

Experimental Examples 19 and 29

The secondary battery was fabricated in the same procedure as in Experimental Example 1, except that the configuration (ratio W2/W1) of the positive electrode side electrolyte layer 16A was different from the configuration (ratio W2/W1) of the negative electrode side electrolyte layer 16B as shown in Table 2, and the cycle characteristics of the secondary battery were evaluated.

TABLE 2

| | Positive electrode side electrolyte layer | | | | | Negative electrode side electrolyte layer | | | | | Capacitance retention |
|---|---|---|---|---|---|---|---|---|---|---|---|
| Experimental | Copolymerization amount (wt %) | | | | | Copolymerization amount (wt %) | | | | | |
| Example | VDF | HFP | Mw | W2/W1 | W3/W1 | VDF | HFP | Mw | W2/W1 | W3/W1 | rate (%) |
| 1 | 92.5 | 7.5 | 600,000 | 2.5 | 2 | 92.5 | 7.5 | 600,000 | 2.5 | 2 | 82 |
| 19 | 92.5 | 7.5 | 600,000 | 12 | 2 | 92.5 | 7.5 | 600,000 | 2.5 | 2 | 91 |
| 20 | 92.5 | 7.5 | 600,000 | 2.5 | 2 | 92.5 | 7.5 | 600,000 | 12 | 2 | 92 |

VDF: vinylidene fluoride,
HFP: hexafluoropropylene,
Mw: weight average molecular weight When the ratio W2/W1 for the positive electrode side electrolyte layer 16A was larger than the ratio W2/W1 for the negative electrode side electrolyte layer 16B (Experimental Example 19), the capacitance retention rate increased as compared with the case where the ratio W2/W1 for the positive electrode side electrolyte layer 16A was the same as the ratio W2/W1 for the negative electrode side electrolyte layer 16B (Experimental Example 1).

Similarly, when the ratio W2/W1 for the negative electrode side electrolyte layer 16B was larger than the ratio W2/W1 for the positive electrode side electrolyte layer 16A (Experimental Example 20), the capacitance retention rate increased as compared with the case where the ratio W2/W1 for the positive electrode side electrolyte layer 16A was the same as the ratio W2/W1 for the negative electrode side electrolyte layer 16B (Experimental Example 1).

From the results shown in Tables 1 and 2, in the case where the electrolyte layer 16 contained the plurality of inorganic particles together with the electrolytic solution and the specific copolymer, the cycle characteristics of the secondary battery were improved when the ratio W2/W1 was 2.5 to 50. Thus, excellent battery characteristics were obtained in the secondary battery including the electrolyte layer.

The present technology is described thus far with reference to embodiments and examples thereof; however, the present technology is not limited to the examples described in the embodiments and examples above, but various modifications may be made. For example, the description has been given of, as an example, the case in which the battery structure is of a laminated-film-type and the battery element has a spirally wound structure. However, applicable structures are not limited thereto. The secondary battery of the present technology is applicable to a case where the secondary battery has other battery structure such as a cylindrical type, a square type, or a coin type, and to a case where the battery element has other structure such as a stacked structure.

Moreover, in the above embodiment and examples, description has been given of the lithium ion secondary battery in which the capacitance of the negative electrode is obtained by insertion and extraction of lithium. However, this is not limitative. For example, the secondary battery of the present technology may be a lithium metal secondary battery in which the capacitance of the negative electrode is obtained by precipitation and dissolution of lithium. Alternatively, the secondary battery of the present technology may be a secondary battery in which the capacitance of the negative electrode is obtained as the sum of the capacitance obtained by insertion and extraction of lithium and the capacitance obtained by precipitation and dissolution of lithium by causing the capacitance of the negative electrode material capable of inserting and extracting lithium to be smaller than the capacitance of the positive electrode.

Moreover, the description has been given of the case where lithium is used as the electrode reactant in the above embodiment and examples. However, the electrode reactant is not limited thereto. The electrode reactant may be, for example, other Group 1 element such as sodium (Na) and potassium (K) in the long form of the periodic table, a Group 2 element such as magnesium (Mg) and calcium (Ca) in the long form of the periodic table, or other light metal such as aluminum (Al). Alternatively, the electrode reactant may be an alloy including one or more of the foregoing series of elements.

The effects described in the present specification are illustrative and non-limiting, and the technology may have effects other than those described in the present specification.

The present technology is described below in further detail according to an embodiment.

(1)
A secondary battery including:
a positive electrode;
a negative electrode; and
an electrolyte layer including an electrolytic solution, a polymer compound including a copolymer containing vinylidene fluoride and hexafluoropropylene as components, and a plurality of inorganic particles, a ratio W2/W1 of a weight W2 of the electrolytic solution to a weight W1 of the polymer compound being 2.5 to 50.

(2)
The secondary battery according to (1), in which a ratio W3/W1 of a weight W3 of the plurality of inorganic particles to the weight W1 of the polymer compound is 0.7 to 5

(3)
The secondary battery according to (1) or (2), in which a copolymerization amount of the hexafluoropropylene in the copolymer is 1.5 wt % to 7.5 wt %.

(4)
The secondary battery according to any one of (1) to (3), in which the copolymer has a weight average molecular weight of 550,000 to 1,200,000.

(5)
The secondary battery according to any one of (1) to (4), in which
the electrolyte layer includes two or more of the copolymers, and
the two or more of the copolymers have different weight average molecular weights, or
the two or more of the copolymers have different copolymerization amounts of the hexafluoropropylene.

(6)
The secondary battery according to any one of (1) to (5), in which
the electrolyte layer includes:
a positive electrode side electrolyte layer provided on the positive electrode; and
a negative electrode side electrolyte layer provided on the negative electrode and having the ratio W2/W1 different from the ratio W2/W1 in the positive electrode side electrolyte layer.

(7)
The secondary battery according to any one of (1) to (6), in which the plurality of inorganic particles contains at least one of aluminum oxide, zirconium oxide, titanium oxide, and magnesium oxide.

(8)
The secondary battery according to any one of (1) to (7), which is a lithium ion secondary battery.

(9)
A battery pack including:
the secondary battery according to any one of (1) to (8);
a controller that controls an operation of the secondary battery; and
a switch section that switches the operation of the secondary battery according to an instruction of the controller.

(10)
An electric vehicle including:
the secondary battery according to any one of (1) to (8);
a convertor that converts electric power supplied from the secondary battery into drive power;
a drive section that operates according to the drive power; and
a controller that controls an operation of the secondary battery.

(11)
An electric power storage system including:
the secondary battery according to any one of (1) to (8);
at least one electrical appliance that is supplied with electric power from the secondary battery; and
a controller that controls electric power supply from the secondary battery to the electrical appliance.

(12)
An electric power tool including:
the secondary battery according to any one of (1) to (8); and
a movable section that is supplied with electric power from the secondary battery.

(13)
An electronic apparatus including the secondary battery according to any one of (1) to (8) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode; and
an electrolyte layer including an electrolytic solution, a polymer compound, and a plurality of inorganic particles;
wherein the polymer compound includes a copolymer consisting of vinylidene fluoride and hexafluoropropylene, wherein a copolymerization amount of the hexafluoropropylene in the copolymer is from 1.5 wt % to 7.5 wt %,
wherein the electrolyte layer includes two or more copolymers including two copolymers consisting of vinylidene fluoride and hexafluoropropylene, and the two copolymers consisting of vinylidene fluoride and hexafluoropropylene have different copolymerization amounts of the hexafluoropropylene; and
wherein a ratio W2/W1 of a weight W2 of the electrolytic solution to a weight W1 of the polymer compound is from 2.5 to 50.

2. The secondary battery according to claim 1, wherein a ratio W3/W1 of a weight W3 of the inorganic particles to the weight W1 of the polymer compound is from 0.7 to 5.

3. The secondary battery according to claim 1, wherein the copolymer has a weight average molecular weight of 550,000 to 1,200,000.

4. The secondary battery according to claim 1, wherein the two copolymers consisting of vinylidene fluoride and hexafluoropropylene have different weight average molecular weights.

5. The secondary battery according to claim 1, wherein the electrolyte layer includes:
a positive electrode side electrolyte layer including a first ratio W2/W1 provided on the positive electrode; and
a negative electrode side electrolyte layer including a second ratio W2/W1 provided on the negative electrode,
wherein the first ratio of the positive electrode side electrolyte layer is different from the second ratio of the negative electrode side electrolyte layer.

6. The secondary battery according to claim 1, wherein the inorganic particles include one or more of aluminum oxide, zirconium oxide, titanium oxide, and magnesium oxide.

7. The secondary battery according to claim 1, wherein the secondary battery includes a lithium ion secondary battery.

8. An electric power storage system comprising:
a driver;
a positive electrode;
and hexafluoropropylene, and
the secondary battery according to claim 1;
at least one electrical appliance configured to be supplied with electric power from the secondary battery; and
a controller configured to control electric power supply from the secondary battery to the electrical appliance.

9. An electric power tool comprising:
the secondary battery according to claim 1; and
a movable section configured to be supplied with electric power from the secondary battery.

10. An electronic apparatus comprising the secondary battery according to claim 1 as an electric power supply source.

11. A battery pack comprising:
a secondary battery;
a controller configured to control an operation of the secondary battery; and
a switch configured to switch the operation of the secondary battery according to an instruction of the controller,
wherein
the secondary battery comprises:
a positive electrode;
a negative electrode; and
an electrolyte layer including an electrolytic solution, a polymer compound, and a plurality of inorganic particles,
wherein the polymer compound includes a copolymer consisting of vinylidene fluoride and hexafluoropropylene, wherein a copolymerization amount of the hexafluoropropylene in the copolymer is from 1.5 wt % to 7.5 wt %,
wherein the electrolyte layer includes two or more copolymers including two copolymers consisting of vinylidene fluoride and hexafluoropropylene, and the two copolymers consisting of vinylidene fluoride and hexafluoropropylene have different copolymerization amounts of the hexafluoropropylene, and
wherein a ratio W2/W1 of a weight W2 of the electrolytic solution to a weight W1 of the polymer compound is from 2.5 to 50.

12. An electric vehicle comprising:
a secondary battery;
a convertor configured to convert electric power supplied from the secondary battery
a driver configured to operate according to the drive power; and
a controller configured to control an operation of the secondary battery,
wherein
the secondary battery comprises:
a negative electrode; and
an electrolyte layer including an electrolytic solution, a polymer compound, and a plurality of inorganic particles,
wherein the polymer compound includes a copolymer consisting of vinylidene fluoride and hexafluoropropylene, wherein a copolymerization amount of the hexafluoropropylene in the copolymer is from 1.5 wt % to 7.5 wt %,
wherein the electrolyte layer includes two or more copolymers including two copolymers consisting of vinylidene fluoride and hexafluoropropylene, and the two copolymers consisting of vinylidene fluoride and hexafluoropropylene have different copolymerization amounts of the hexafluoropropylene; and
wherein a ratio W2/W1 of a weight W2 of the electrolytic solution to a weight W1 of the polymer compound is from 2.5 to 50.

* * * * *